US012326584B2

(12) United States Patent
Mossberg et al.

(10) Patent No.: US 12,326,584 B2
(45) Date of Patent: *Jun. 10, 2025

(54) DIFFRACTION GRATING ARRAY FOR WIDE-ANGLE ILLUMINATION

(71) Applicant: II-VI Delaware, Inc., Wilmington, DE (US)

(72) Inventors: Thomas W. Mossberg, Eugene, OR (US); Jianji Yang, Eugene, OR (US); Dmitri Iazikov, Eugene, OR (US); Christoph M. Greiner, Eugene, OR (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,112

(22) Filed: Jan. 24, 2024

(65) Prior Publication Data

US 2024/0159946 A1   May 16, 2024

Related U.S. Application Data

(63) Continuation of application No. 17/805,443, filed on Jun. 3, 2022, now Pat. No. 11,921,306, which is a continuation of application No. 16/525,574, filed on Jul. 30, 2019, now Pat. No. 11,378,724.

(60) Provisional application No. 62/784,484, filed on Dec. 23, 2018.

(51) Int. Cl.
*G02B 5/18* (2006.01)
*G02B 27/48* (2006.01)

(52) U.S. Cl.
CPC ......... *G02B 5/1819* (2013.01); *G02B 5/1847* (2013.01); *G02B 27/48* (2013.01); *G02B 2005/1804* (2013.01)

(58) Field of Classification Search
CPC .... G02B 5/1819; G02B 5/1847; G02B 27/48; G02B 2005/1804; G02B 27/425
USPC ........................................................ 359/569
See application file for complete search history.

(56) References Cited

U.S. PATENT DOCUMENTS

| 3,488,124 A | 1/1970 | Lamberts et al. |
| 4,094,575 A | 6/1978 | Kellie |
| 4,568,141 A | 2/1986 | Antes |
| 6,256,436 B1 | 7/2001 | Nakama |
| 6,285,813 B1 | 9/2001 | Schultz et al. |

(Continued)

OTHER PUBLICATIONS

Co-owned U.S. Appl. No. 16/558,033 entitled "Optical apparatus for wide-angle illumination" filed Aug. 30, 2019 in the names of Greiner et al.

(Continued)

*Primary Examiner* — Audrey Y Chang
(74) *Attorney, Agent, or Firm* — Blank Rome LLP

(57) ABSTRACT

An incident optical beam illuminates a subset of contiguous array of diffraction gratings on a substrate and produces one or more diffracted output beams. The grating array can be arranged so that (i) multiple incident beams result in a contiguous composite solid angle of far-field illumination, (ii) multiple output beams arising from any one incident beam do not overlap in the far field, or (iii) both. The gratings of the array can be arranged to produce a desired far-field illumination intensity profile. The grating array can be arranged so as to suppress or eliminate laser speckle arising from the output beams.

36 Claims, 8 Drawing Sheets

(56) References Cited

U.S. PATENT DOCUMENTS

| | | |
|---|---|---|
| 6,312,961 B1 | 11/2001 | Voirin et al. |
| 6,314,220 B1 | 11/2001 | Mossberg et al. |
| 6,563,966 B1 | 5/2003 | Tang |
| 6,606,432 B2 | 8/2003 | Gaylord et al. |
| 6,674,928 B2 | 1/2004 | Johnson et al. |
| 6,678,429 B2 | 1/2004 | Mossberg et al. |
| 6,747,798 B2 | 6/2004 | Kristensen et al. |
| 6,822,217 B1 | 11/2004 | Murgatroyd et al. |
| 6,823,115 B2 | 11/2004 | Greiner et al. |
| 6,829,417 B2 | 12/2004 | Greiner et al. |
| 6,859,318 B1 | 2/2005 | Mossberg |
| 6,879,441 B1 | 4/2005 | Mossberg |
| 6,885,792 B2 | 4/2005 | Eggleton et al. |
| 6,917,735 B2 | 7/2005 | Murgatroyd et al. |
| 7,257,877 B2 | 8/2007 | Hanaoka et al. |
| 7,457,496 B2 | 11/2008 | Joyner |
| 8,169,703 B1 | 5/2012 | Mossberg et al. |
| 10,207,531 B2 * | 2/2019 | Seils .............. G02B 5/1847 |
| 2007/0014017 A1 | 1/2007 | Thome-Forster et al. |
| 2008/0003528 A1 | 1/2008 | Gaylord et al. |
| 2008/0018874 A1 | 1/2008 | Dusa et al. |
| 2008/030857 A1 | 2/2008 | Ohnishi et al. |
| 2011/0035171 A1 | 2/2011 | Ziger |
| 2015/0352881 A1 | 12/2015 | Seils et al. |
| 2016/0286202 A1 | 9/2016 | Romano et al. |
| 2020/0064642 A1 | 2/2020 | Du et al. |

OTHER PUBLICATIONS

Co-owned U.S. Appl. No. 16/719,098 entitled "Optical apparatus for wide-angle illumination" filed Dec. 18, 2019 in the names of Gray et al.

Kvvon; "Pitch and Size Reduction Lithography", Slinghoon Kwon et al., Molecular Foundry Research Highlight, LBNL Materials Sciences Division, 2007.

LightSmyth; Application Note entitled "Application Note: Monolithic Silicon Grating Arrays" published Apr. 10, 2007 by LightSmyth Technologies Inc.

LightSmyth; Application Note entitled "Gratings with Integral Calibration Features"; published prior to Sep. 6, 2007 by LightSmyth Technologies Inc.

LightSmyth; Application Note entitled "Monolithic Diffraction Grating Arrays ena~le Wide-Bandwidth Single-snot and Self-Calibrated Spec.irorneters"; publist1ed prior to Sep. 6, 2007 by UghtSrny1h Technologies Inc.

* cited by examiner

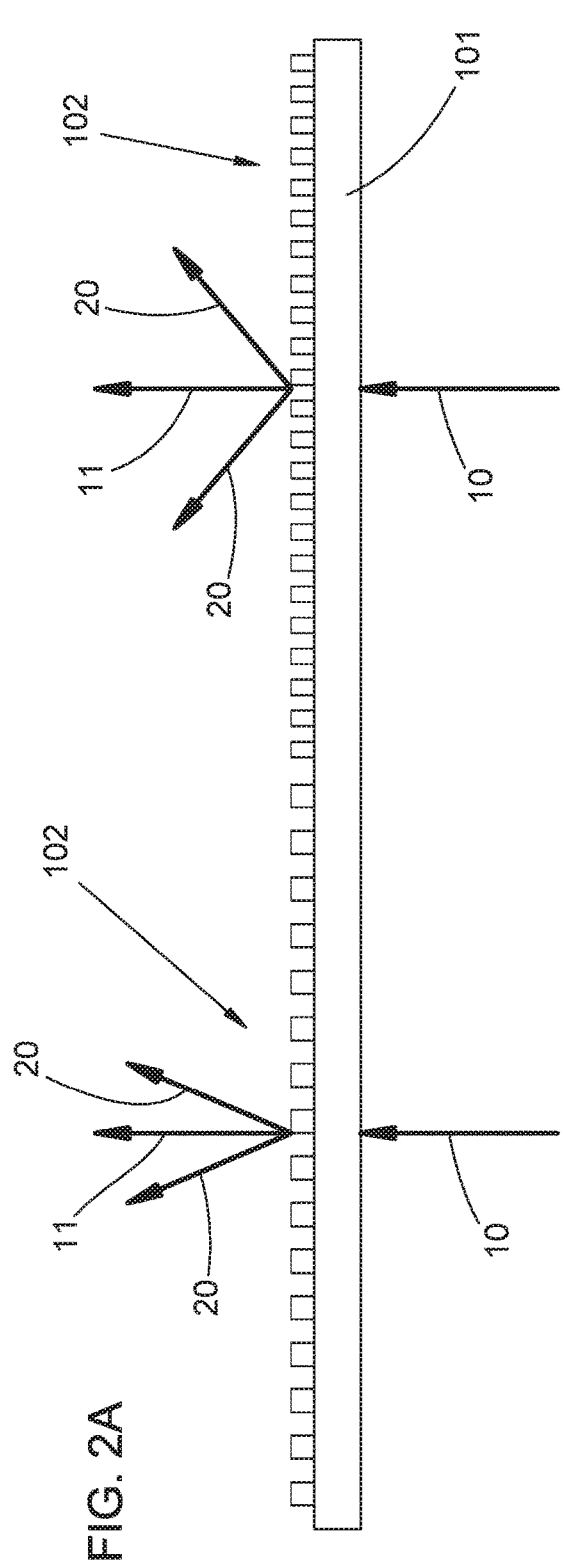
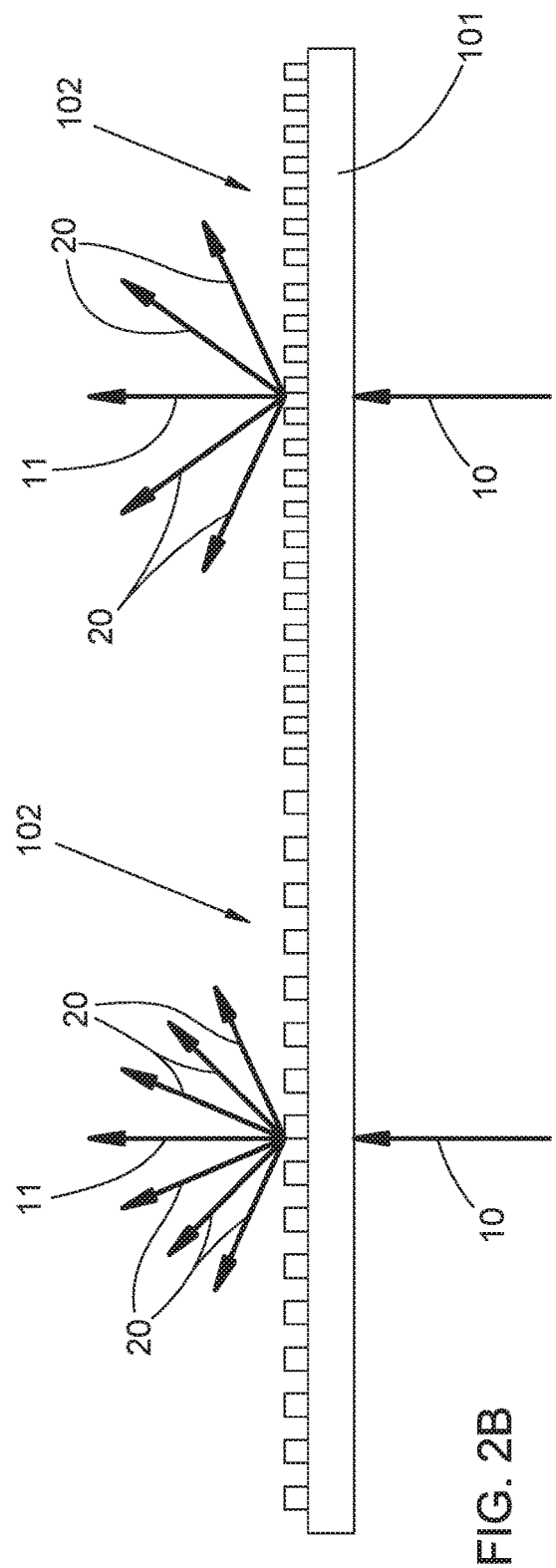

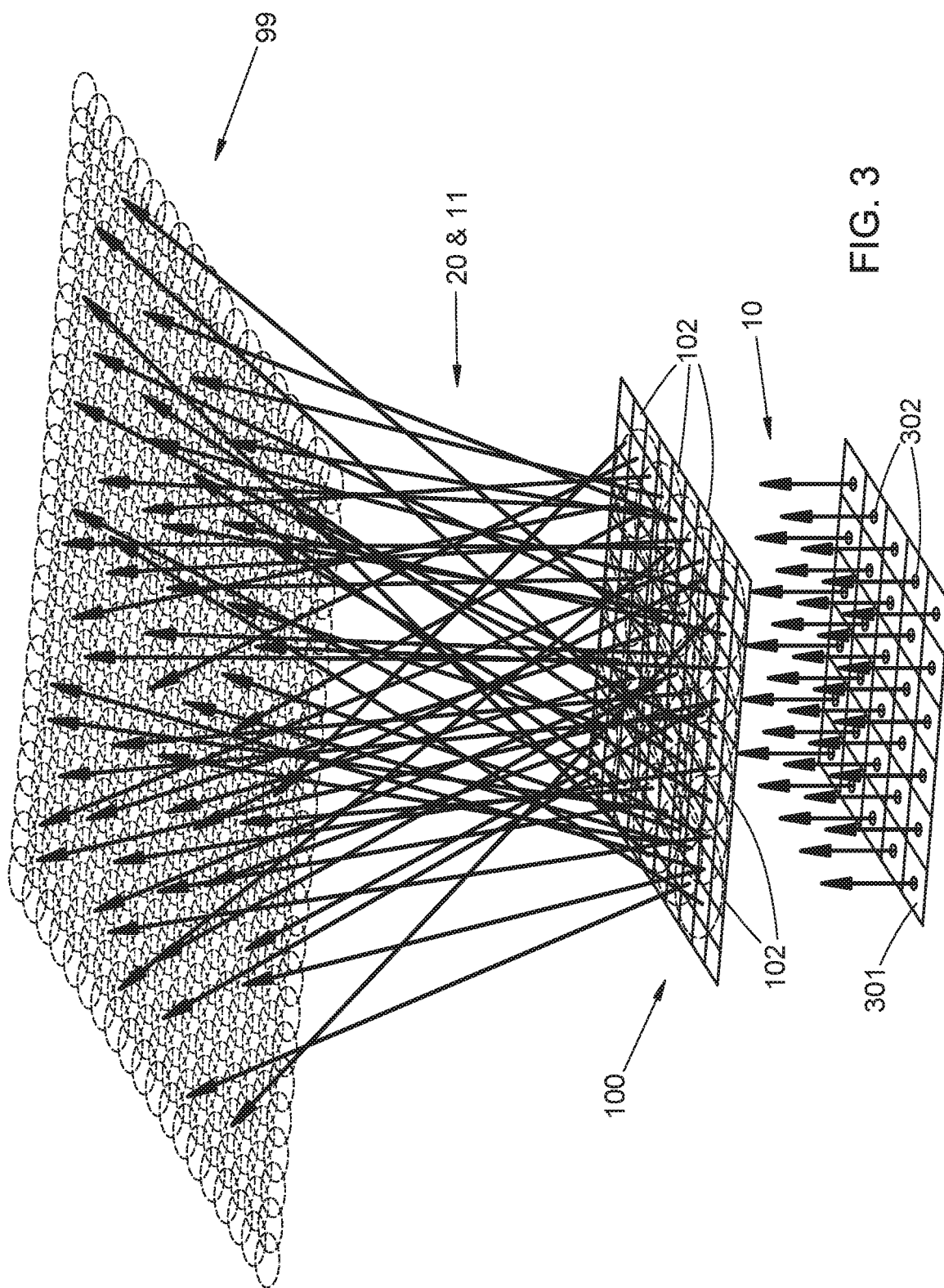

DIFFRACTION GRATING ARRAY FOR WIDE-ANGLE ILLUMINATION

BENEFIT CLAIMS TO RELATED APPLICATIONS

This application is a continuation of U.S. patent application Ser. No. 17/805,443, filed Jun. 3,2022, which is a continuation of U.S. patent application Ser. No. 16/525,574, filed Jul. 30, 2019 (now U.S. Pat. No. 11,378,724) which claims benefit of U.S. provisional App. No. 62/784,484 entitled "Diffraction grating array for wide-angle illumination" filed Dec. 23, 2018 in the names of Thomas W. Mossberg, Jianji Yang, Dmitri lazikov, and Christoph M. Greiner, said provisional application being hereby incorporated by reference as if fully set forth herein.

FIELD OF THE INVENTION

The field of the present invention relates to wide-angle illumination. In particular, arrays of diffraction gratings for providing wide-angle illumination, and methods of use and fabrication thereof, are disclosed herein.

SUMMARY

An inventive grating array comprises a grating substrate bearing a contiguously arranged set of multiple discrete diffraction gratings. The grating substrate is substantially transparent over an operational wavelength range, and the set of multiple diffraction gratings is positioned on a surface of the grating substrate or within the grating substrate. Each diffraction grating of the set is characterized by a corresponding grating wavevector, and the multiple diffraction gratings are positioned and arranged on or in the grating substrate so that each diffraction grating of the set differs from at least one other diffraction grating of the set with respect to the corresponding grating wavevectors. The multiple diffraction gratings are positioned and arranged so that each one of multiple incident optical signal beams is incident on a corresponding non-empty illuminated contiguous subset of the multiple diffraction gratings. Corresponding diffracted portions of each incident optical signal beam are each diffracted into one or more corresponding output optical signal beams by non-zero-order diffractive transmission by corresponding diffraction gratings of the corresponding illuminated contiguous subset of the multiple diffraction gratings. Each incident optical signal beam is characterized by a corresponding incident wavelength within the operational wavelength range and a corresponding incident propagation direction; each of the corresponding output optical signal beams is characterized by the corresponding incident wavelength, a corresponding output propagation direction, and a corresponding output beam far-field divergence. Positioning and arrangement of the multiple diffraction gratings results in angular separation of the output propagation direction of each one of the output optical beams, from the output propagation direction of at least one other of the output optical beams, is less than the corresponding far-field divergence of that optical beam, so that collectively the output optical beams and zero-order-transmitted portions of the incident optical beams result in a contiguous composite solid angle of far-field illumination.

Another inventive grating array is similar to the grating array described above, but differs in that, for each illuminated subset of diffraction gratings, positioning and arrangement of the multiple diffraction gratings results in angular separation of the output propagation direction of the corresponding output optical beam of each one of the diffracted portions of the incident optical signal beam, from output propagation directions of the corresponding output optical beams of each of the other diffracted portions of the same incident optical signal beam, exceeds corresponding far-field divergence of that output optical beam. As a result, different output optical signal beams arising from a common incident optical signal beam do not overlap in the far field, but instead form discrete illuminated areas. One or more incident optical beams can be employed. If multiple incident optical signal beams are employed, the grating array can be arranged to produce multiple discrete illuminated areas, or instead can be arranged to produce a contiguous composite solid angle of far-field illumination.

Objects and advantages pertaining to wide-angle illumination or arrays of diffraction gratings may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1, 2A, and 2B illustrate schematically output beams formed by zero-order transmission and non-zero-order diffractive transmission of portions of an incident beam by a grating array. FIG. 1 is a perspective view and FIGS. 2A and 2B are side cross-sectional views.

FIG. 3 illustrates schematically far-field illumination formed by zero-order transmission and non-zero-order diffractive transmission of portions of multiple incident beams by a grating array.

Figure 1:
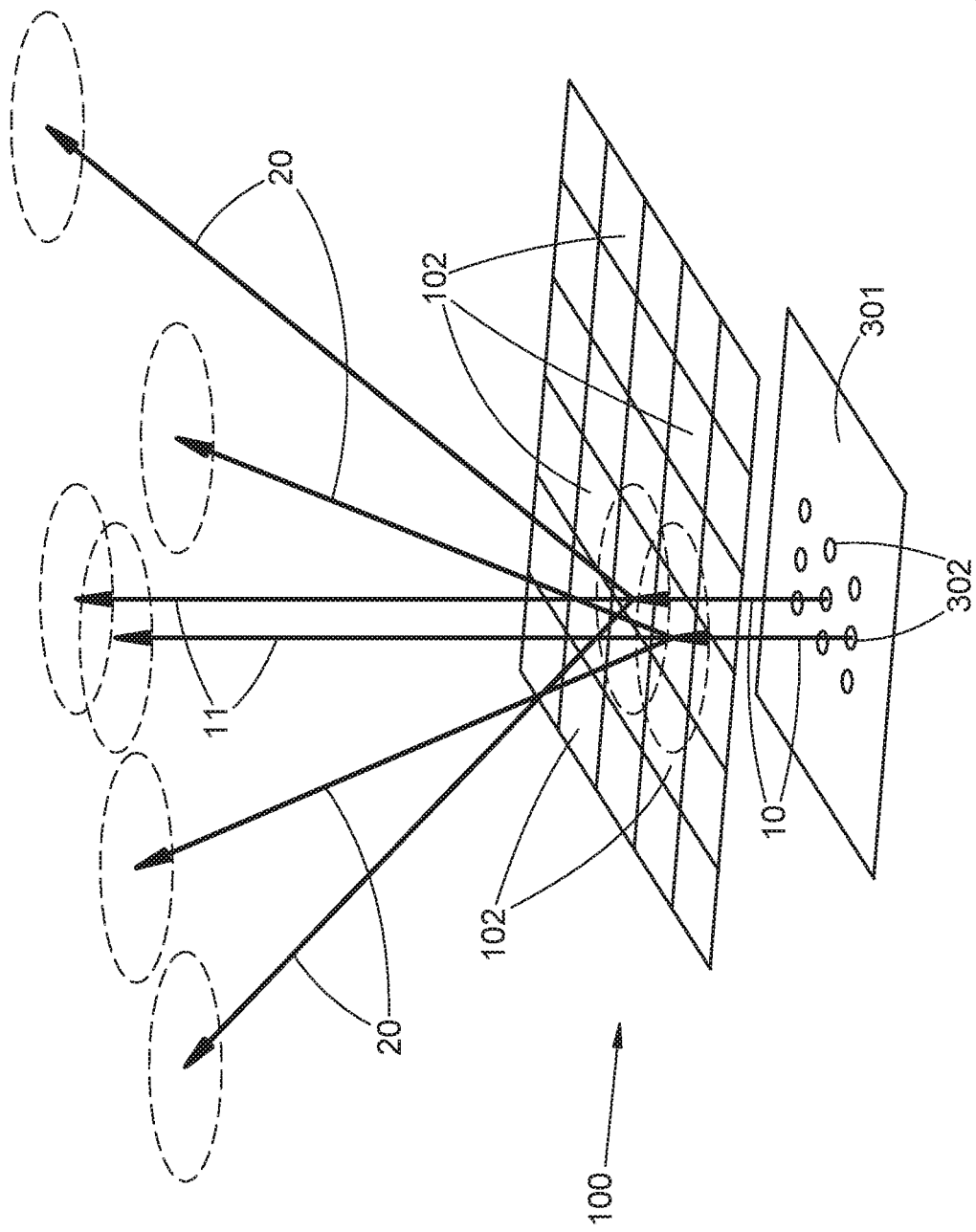

The embodiments depicted are shown only schematically; all features may not be shown in full detail or in proper proportion, certain features or structures may be exaggerated relative to others for clarity, and the drawings should not be regarded as being to scale. For example, the actual diffraction gratings depicted as having a handful of diffractive lines (e.g., grooves or ridges) typically have hundreds or thousands of lines per millimeter; the number of grating lines is reduced in the drawings for clarity. Similarly, the height, depth, or width of each grating line often can be exaggerated relative to, e.g., the thickness of an underlying substrate, or the number of individual gratings present on a substrate or illuminated by a single incident beam can be reduced for clarity; the number of light sources, incident beams, or output beams can be reduced for clarity. The embodiments shown are only examples, and should not be construed as limiting the scope of the present disclosure or appended claims.

DETAILED DESCRIPTION OF EMBODIMENTS

The need for a wide-angle illumination source arises in a number of different circumstances. For example, compact wide-angle illumination sources are employed in various contexts of motion detection or recognition, object detection or recognition, 3D sensing, and so forth. Such compact sources often employ semiconductor-based light sources, such as light-emitting diodes (LEDs) or semiconductor lasers, which are often arranged as an array of multiple sources to provide a desired level of illumination. A common source of laser-based illumination is a vertical-cavity surface-emitting laser (VCSEL), usually an array of multiple VCSELs formed on a common laser substrate. Such an arrangement can yield high output powers by providing many VCSELs packed into a relatively small area (e.g., spacings between individual VCSELs on the order of 100 μm or 50 μm or less, with tens, hundreds, or thousands of individual VCSELs forming the array).

In many instances, the angular range of illumination provided directly by the light sources is insufficient, or the intensity distribution of the illumination is unsatisfactory. For example, output of a VCSEL typically spans an angular range of only about 20° to 25° in each dimension; the illumination cones of the multiple VCSELs in an array are superimposed in the far field. In many applications a larger solid angle of far-field illumination is desired, e.g., greater than about 45° by 60°, greater than about 80° by 100°, or even greater than about 90° by 120°. In addition, the spatial profile of the VCSEL output is often suboptimal for many illumination applications. Many VCSELs produce an output beam with a spatial profile that is approximately gaussian at relatively low output power, or that resembles a so-called doughnut profile at higher output power. In many instances a spatial profile (more precisely, a far-field illumination intensity angular profile) is desired that is relatively invariant with angle (i.e., flat) or that varies as $1/\cos^N \theta$ (wherein N is an integer and $\theta$ is measured from the propagation direction of the center of the output beam), or that has some other suitable, desirable, or necessary angular profile. Illumination profiles that vary as $1/\cos^N \theta$, or include portions that have such an angular dependence, are sometimes referred to as "batwing" profiles; the integer N is usually less than 10; in many common instances N=4 or N=7.

Accordingly, disclosed herein are inventive articles for receiving one or more incident optical signal beams and redirecting different portions of each one of those incident beams to form multiple output optical signal beams propagating in different output propagation directions. The article is structurally arranged so that, collectively, the output optical beams arising from the one or more incident beams, along with portions of the incident beams that are transmitted without redirection, form a desired far-field illumination intensity profile that can be larger (i.e., subtends a larger contiguous solid angle) than the profile produced by the one or more incident beams, or that can also exhibit a spatial variation that differs from that of the one or more incident beams, or both. The general arrangement is illustrated schematically in FIGS. 1, 2A, 2B, and 3 which shows one or more incident beams 10 incident on an article 100 (i.e., a grating array 100) producing multiple output beams 20 deflected into different propagation directions as well as a portion of each incident beam 10 that is transmitted without deflection through the grating array 100 as a corresponding output beam 11 (arrows indicating propagation directions, dashed outlines in FIGS. 1 and 3 indicating corresponding beam sizes). In particular, the inventive articles disclosed herein can be employed to transform the output of a VCSEL array so as to span a larger solid angle in the far field than the VCSEL output, or to exhibit a desired far-field illumination spatial profile that differs from the spatial profile of the VCSEL output, or both.

An inventive article 100 (i.e., inventive grating array) according to the present disclosure comprises a grating substrate 101 bearing a contiguously arranged set of multiple diffraction gratings 102. "Array" as used herein encompasses any one- or two-dimensional arrangement of multiple objects (gratings, lasers, lenses, and so forth), including regular, irregular, periodic, repeating, random, or other arrangement. In many examples the grating substrate 101 is substantially flat; the present disclosure and appended claim nevertheless also encompass examples wherein the grating substrate is curved or otherwise not flat. "Contiguously arranged" indicates that the gratings 102 are arranged on the substrate 101 abutting one another so as to substantially fill the area of the substrate 101 collectively occupied by the gratings 102, similar to how the various pieces of fabric are joined in a patchwork quilt. With the gratings 102 thus contiguously arranged, no portion of an incident optical signal beam, or only a negligible portion, is transmitted through the grating array 100 without being transmitted through one of the gratings 102. In other words, little or no incident light "leaks" between the gratings 102 through the grating array 100. The grating substrate 101 is substantially transparent over an operational wavelength range that typically includes a design wavelength or a nominal source wavelength, and the set of multiple diffraction gratings 102 is positioned on a surface of the grating substrate 101 or within the grating substrate 101. Each diffraction grating 102 comprises a set of suitably arranged diffractive elements of any suitable type or arrangement, e.g., grooves, ridges, posts, holes, holographic features, refractive index spatial modulation based on density or material composition, and so forth (omitted for clarity from FIGS. 1 and 3; shown in cross-section in FIGS. 2A and 2B). The grating substrate 101 or the multiple diffraction gratings 102 can include one or more materials among: doped or undoped silicon; one or more doped or undoped III-V semiconductors; doped or undoped silicon oxide, nitride, or oxynitride; one or more doped or undoped metal oxides, nitrides, or oxynitrides; one or more optical glasses; or one or more doped or undoped polymers. The multiple diffraction gratings 102 can be formed in or on the grating substrate 101, or a layer bearing the multiple diffraction gratings 102 can be formed on, adhered to, or assembled with the grating substrate 101 in any suitable way. The multiple diffraction gratings 102 can be formed in any suitable way (on or in the substrate 101 or a separate layer), including but not limited to one or more of: spatially selective dry or wet etching, spatially selective deposition, spatially selective diffusion or densification, photolithography, stamping, molding, embossing, or replication from a master.

Each diffraction grating of the set is characterized by a corresponding grating wavevector. As is generally understood, a grating wavevector has a magnitude that is inversely proportional to the spacing between diffractive elements of a grating (e.g., inversely proportional to the groove spacing of a ruled grating; two gratings 102 having different groove spacings illustrated schematically in FIGS. 2A and 2B) and is perpendicular to the direction of that spacing (e.g., perpendicular to the grooves of a ruled grating). The grating wavevector determines how an incident portion of the optical signal beam 10 at a given wavelength and incidence angle is deflected or redirected by each grating 102 into one or more corresponding output optical beams 20 by non-zero-order diffractive transmission. In some examples, the diffraction gratings 102 can each be characterized by only a single corresponding wavevector direction, i.e., they are so-called one-dimensional gratings, wherein the diffractive elements typically are elongated grooves, ridges, or other type of diffractive line or curve. In some other examples, the diffraction gratings 102 can each be characterized by two corresponding wavevector directions that are not parallel to each other, i.e., they are so-called two-dimensional gratings, wherein the diffractive elements typically are two-dimensional arrays of holes, posts, or other type of discrete grating element. The grating wavevector can vary with position across one or more of the gratings 102 (e.g., non-uniform groove spacing or curved grooves of a ruled grating) or can be constant across each of the gratings 102 (e.g., straight, parallel, uniformly spaced grooves of a ruled grating). In either of those cases the corresponding grating wavevectors vary among different diffraction gratings 102, because the multiple diffraction gratings 102 of the inventive grating array 100 are positioned and arranged on or in the grating substrate 101 so that each diffraction grating 102 differs from at least one other diffraction grating 102 of the set with respect to the corresponding grating wavevectors. In other words, multiple different wavevectors are exhibited by the set of diffraction gratings 102. Put still another way, the set of diffraction gratings 102 comprises multiple non-empty wavevector subsets, with each wavevector subset including those diffraction gratings that are each characterized by a corresponding common grating wavevector that differs from common grating wavevectors of the other wavevector subsets.

One or more incident optical signal beams 10 are incident on the diffraction gratings 102. In FIGS. 1 and 3 the beams 10 represent two different incident optical signal beams 10 arising from two different corresponding light sources 302. In FIGS. 2A and 2B, the beams 10 can similarly represent two different incident optical signal beams 10 arising from two different corresponding light sources 302, or instead they can represent different portions of a single incident optical signal beam 10 arising from a single light source 302. Each incident optical signal beam 10 is characterized by a corresponding incident wavelength within the operational wavelength range and each is incident, along a corresponding incident propagation direction, on a corresponding non-empty illuminated contiguous subset of the multiple diffraction gratings 102 (i.e., those gratings 102 that lie within the spot illuminated by the incident beam 10, the illuminated spot being designated by the dashed outlines on the grating array 100 in FIGS. 1 and 3). In many examples that include multiple incident optical signal beams 10, all the corresponding incident propagation directions are the same (i.e., the incident optical signal beams 10 are substantially parallel to one another), and they are all incident substantially normal to the grating substrate 101; the present disclosure and appended claims nevertheless also encompass examples wherein the incident propagation directions differ among multiple incident beams 10, or wherein one or more or all of the incident beams 10 are not normal to the grating substrate 101. In many examples that include multiple incident optical signal beams, all the corresponding incident wavelengths are nominally the same, or at least within a narrow range of one another (e.g., within a few nm of a nominal wavelengths between 800 nm and 1000 nm); the present disclosure nevertheless also encompasses examples wherein the incident wavelengths differ among the incident optical beams 10. The conditions of the same normal incidence direction and same or similar nominal incident wavelength for all of the multiple incident beams 10 typically arise, e.g., when the multiple incident optical signal beams 10 arise from a VCSEL array.

In some examples, an operational wavelength range can lie within a range from about 0.20 µm to about 10 µm, from about 0.4 µm to about 2.5 µm, or from about 800 to about 1000 nm. In some examples employing multiple incident beams 10, the corresponding incident wavelengths can all be within about 5.0 nm of a nominal incident wavelength within the operational wavelength range, or within about 2.0 nm of the nominal wavelength, or within about 1.0 nm of the nominal wavelength.

Each incident beam 10 illuminates a corresponding subset of the diffraction gratings 102, each illuminated subset includes one or more gratings excluded by one or more other illuminated subsets, and each illuminated subset excludes one or more gratings included by one or more other illuminated subsets. In many examples, each illuminated subset includes diffraction gratings 102 belonging to different wavevector subsets. For each incident optical signal beam 10, each grating 102 of the corresponding illuminated subset receives a corresponding portion of the incident beam 10, and by non-zero-order diffractive transmission diffracts portions of that incident optical signal beam 10 into one or more corresponding output optical signal beams 20. Each output optical signal beam 20 is characterized by the corresponding incident wavelength, a corresponding output propagation direction, and a corresponding output beam far-field divergence. For each portion of a given incident beam 10 incident on a given diffraction grating 102, the corresponding output propagation directions of the one or more output beams 20 depend on the incident wavelength, the incidence angle (of the corresponding portion of the incident beam 10 on the given grating 102; can differ from the propagation direction of the beam 10 depending on the convergence or divergence properties of the beam 10), and the grating wavevector (or the given grating 102). Thus, each incident beam 10, incident on multiple gratings 102, can give rise to multiple output beams 20 propagating along multiple different output propagation directions (e.g., as in FIG. 1; as in FIGS. 2A and 2B, if the beams 10 in those figures are taken to represent different spatial portions of a single incident optical signal beam arising from a single light source and incident on different gratings 102). In addition to one or more output beams 20, a zero-order-transmitted portion (i.e., a non-diffracted portion) of each incident beam 10 is transmitted through the gratings 102 of the grating array 100 as a zero-order-transmitted output beam 11. Some non-negligible degree of such zero-order transmission is very nearly unavoidable, because achieving perfect, 100% diffraction efficiency with a real diffraction grating is quite unlikely. While the different output beams 20 arising from a given incident beam 10 vary in output direction among the diffraction gratings 102 of the corresponding illuminated subset, and are therefore less likely to overlap in the far field, the zero-order-transmitted beams 11 of all the gratings 102 of the illuminated subset propagate in the same direction, and so are superimposed in the far-field (and could be thought of collectively as a single output beam 11 arising from the incident beam 10). Consequently, the zero-order-transmitted output beams 11 typically contribute significantly (or at least non-negligibly) to any spatial illumination profile produced using the grating array 100 and typically must be accounted for when designing the grating array 100 to produce a desired (i.e., operationally acceptable) far-field illumination profile.

In many examples, angular separation of the output propagation direction of each one of the output optical beams 20, from the output propagation direction of at least one other of the output optical beams 20, is less than the corresponding far-field divergence of that optical beam 20. In other words, each output beam 20 spatially overlaps with one or more other output beams 20 in the far field. Output beams 20 that overlap one another can arise from the same incident beam 10 or from different incident beams 10. The gratings 102 are arranged so that, collectively, the non-zero-order-diffracted output optical beams 20 and the zero-order-transmitted output optical beams 11 result in a contiguous composite solid angle of far-field illumination (e.g., illustrated schematically in FIG. 3 as illumination pattern 99; dashed curves represent corresponding spots illuminated by each of the beams 20 and 11; only a sampling is shown of the many output beams 11 and 20 that produce the illuminated spots of the illumination pattern 99). The illuminated solid angle is "composite" in the sense that the contiguous illumination is a superposition of all of the output beams 11 and 20 arising from the grating array 100 acting on the incident beams 10. The illuminated solid angle is "contiguous" in the sense that adjacent areas illuminated by each beam abut or overlap so that there are no significant non-illuminated gaps between them. That contiguous composite solid angle can be larger than a non-diffractive solid angle of far-field illumination resulting from only the zero-order-transmitted portions of the incident optical beams, i.e., from only the output beams 11 (spatially equivalent to far-field illumination by the incident beams 10 if the grating array 100 were not present). The diffraction gratings 102 can instead or in addition be collectively arranged so as to produce a desired shape or angular distribution of the illumination intensity, e.g.: square or rectangular instead of circular or elliptical; flat or batwing ($1/\cos^N \theta$) instead of gaussian or doughnut; relatively sharp edges instead of tapered edges like a gaussian distribution. In instances wherein a change of illumination spatial profile is desired without changing the solid angle of far-field illumination, the contiguous composite solid angle of far-field illumination can be about equal to a non-diffractive solid angle of far-field illumination resulting from only the zero-order-transmitted portions 11 of the incident optical beams 10; in instances wherein a larger illumination spatial profile is desired the contiguous composite solid angle of far-field illumination can be larger than the non-diffractive solid angle of far-field illumination resulting from only the zero-order-transmitted portions 11 of the incident optical beams 10, including larger than the various angular ranges given above. In some examples, the contiguous composite solid angle of far-field illumination is greater than or about equal to 45° by 60°; in some examples, the contiguous composite solid angle of far-field illumination is greater than or about equal to 80° by 100°; in some examples, the contiguous composite solid angle of far-field illumination is greater than or about equal to 90° by 120°. If a batwing distribution is employed (in some or all of the far-field illumination), the integer N typically is less than 10, and in many examples N=4 or N=7. In some examples, because of the non-negligible contribution of the zero-order-transmitted output beams 11 at small angles θ, a batwing-like spatial profile is obtained only for sufficiently large angles θ, e.g., for θ greater than about 10°. For θ less than about 10° the far field spatial profile in some examples can predominantly resemble the incident beams 10, in some instances being relatively flat at small angles and in other instances exhibiting a local maximum at about θ=0°.

If the multiple incident beams 10 are generated by incoherent light sources 302 such as, e.g., light-emitting diodes (LEDs), then it matters little whether different output beams 20 arising from the same incident beam 10 overlap in the far field or not, as long as a contiguous composite solid angle of illumination is produced collectively by all output beams 11 and 20 arising from all incident beams 10. If coherent light sources 302 (e.g., laser sources such as VCSELs) are employed, however, complication can arise. If output beams 20 arising from different incident beams 10 (and hence from different laser sources) spatially overlap in the far field, no particular problem arises because those different laser sources typically would not be spatially or temporally coherent with each other, and so neither would the corresponding output beams 20. On the other hand, two different output beams 20 arising from the same incident beam 10 (and hence from the same laser source 302) would be coherent with each other. If such coherent output beams 20 were to spatially overlap in the far field, optical interference between them can cause undesirable spatial variations of the illumination intensity (e.g., light and dark interference fringes).

To avoid such undesirable interference effects, in some examples the diffraction gratings 102 are arranged collectively so as to reduce or eliminate far-field spatial overlap of pairs of output beams 20 that arise from the same incident beam 10. To achieve that result, the multiple diffraction gratings are collectively positioned and arranged so that, for each incident optical signal beam 10, angular separation of each corresponding output optical beam 20 from each of the other output beams 20 arising from that the same incident beam 10 exceeds the far-field divergence of the output optical beams 20. Those angular separations can be achieved by suitable choices for the grating wavevectors of the gratings 102 that make up the corresponding grating subset illuminated by each incident beam 10. Note that angular separation is measured between the propagation directions at the centers of each output beam 20, and that the far-field divergence is the full angle between the 1/e.sup.2 points of the intensity profile of each output beam 20. The criterion that separation angle exceeds far-field divergence does not guarantee elimination of any far-field overlap, but does typically reduce such overlap that does occur to a negligible level.

In other examples, relative phases of different output beams 20 arising from the same incident beam 10 can be manipulated to achieve desired far-field behavior when those beams spatially overlap. As noted above, the multiple diffraction gratings 102 comprise multiple wavevector subsets of gratings, wherein the gratings 102 of each gating subset are all characterized by the same grating wavevector. That wavevector subset can be thought of as discrete, separate areal segments of a single virtual reference grating covering the entire grating substrate 101. The diffractive elements of one or more gratings of the wavevector substrate can be shifted, displaced, or offset relative to a set of virtual reference gratings lines of the virtual reference grating. Such an offset effects a phase shift of the corresponding output beam 20 relative to other output beams 20 arising from the same incident beam 10 incident on other gratings 102 of the wavevector subset. A suitable set of phase shifts can be calculated that yield a desired (i.e., operationally acceptable) far-field illumination spatial profile.

In a different set of examples, contiguous far-field illumination is not the goal, but instead a set of discrete illuminated spots is desired. In such examples, the diffraction gratings of the grating array 100 can be positioned and arranged so that angular separation between any two output beams 20 (whether arising from the same incident beam 10 or from different incident beams 10) exceeds the far-field divergences of those output beams. Accordingly, there is no, or only negligible, spatial overlap among the output beams 20 in the far field. In some such examples only a single incident beam 10 is employed, while in other examples multiple incident beams 10 are employed.

An illumination source arranged to operate in any of the ways described above can include a suitably arranged inventive array 100 of diffraction gratings 102 in combination with a set of one or more corresponding suitably positioned and arranged optical sources 302 that provide the incident optical signal beams 10. Each source 302 is arranged so as to direct a corresponding one of the incident optical signal beams 10 onto the grating array 100 and to illuminate the corresponding illuminated subset of the multiple diffraction gratings 102. In some examples, the multiple diffraction gratings 102 and the corresponding optical sources 302 are positioned and arranged so that each one of the multiple diffraction gratings 102 is illuminated by at most one of the multiple incident signal beams 10 (i.e., no intersection of different illuminated subsets of the gratings 102). In other examples, the multiple diffraction gratings 102 and the corresponding optical sources 302 are positioned and arranged so that one or more of the multiple diffraction gratings 102 are illuminated by two or more of the multiple incident signal beams 302 (i.e., one or more non-empty intersections among the illuminated subsets of the gratings 102).

In some examples, the gratings 102 and source 302 can be positioned and arranged so that each illuminated subset (i.e., those gratings 102 illuminated by a given incident beam 10) includes ten or more of the multiple diffraction gratings 102 in some examples, twenty or more in some examples, thirty or more in some examples, forty or more in some examples, or fifty or more in some examples.

As already noted above, light-emitting diodes (LEDs) and semiconductor lasers can be readily employed as the optical sources 302. In some examples the optical sources 302 are arranged as multiple LEDs or semiconductor lasers positioned on a common source substrate 301, and the grating substrate 101 is attached to the source substrate 301. In some of those examples, the optical sources are arranged as a two-dimensional array of semiconductor lasers 302 positioned on the common source substrate 301 (square or rectangular arrays shown in the drawings; any other suitable arrangement can be employed). In some examples the semiconductor lasers 302 can be arranged on the substrate 301 as vertical-cavity surface-emitting lasers (VCSELs), either arranged to emit upward through the processed side of the source substrate 301, or instead arranged to emit through the back side of the source substrate 301 (so-called back-emitting VCSELs). In some examples, the grating substrate 101 and the source substrate 301 are attached by being in fact a single, common substrate on which are integrally formed both the array of sources 302 (e.g., LEDs, VCSELs, or other) and the array of diffraction gratings 102. In other examples, the grating substrate 101 and the source substrate 301 are separate, discrete substrates, and the grating substrate 101 is attached directly or indirectly (i.e., via some intervening structure) to the source substrate 301.

In some examples of an illumination source incorporating an inventive grating array 100, the corresponding optical sources 302 can include corresponding lenses. Each corresponding lens is substantially aligned with a corresponding one of the light sources 302 so as to focus, collimate, or alter the far-field divergence of the corresponding incident optical signal beam 10 emitted by that source 302. The lenses can be refractive or diffractive in nature. The lenses can be integrally formed on the common source substrate 301, integrally formed on the grating substrate 101, or can be formed on a separate, discrete lens substrate that is attached directly or indirectly to the source substrate 301 or the grating substrate 101. A commonly employed arrangement includes an array of VCSELs 302 with corresponding lenses integrally formed on the source substrate 301 and arranged to provide substantially collimated incident beams 10, with a separate, discrete grating substrate 101 attached to the source substrate over the lenses. Other suitable arrangements can be employed, e.g., gratings 102 integrally formed on the source substrate 301 and separates lenses attached, or gratings 102, sources 302, and lenses all integrally formed on a single substrate.

Instead of employing lenses to focus, collimate, or alter far-field divergence of the output beams 20, instead the diffraction gratings themselves can be arranged to provide that functionality. In addition to providing non-zero-order diffractive transmission, diffractive elements (e.g., grating lines) that are suitably curved or non-uniformly spaced can also provide suitable focusing, collimating, or defocusing of the output beam. Examples of such arrangements are disclosed in, e.g., U.S. Pub. No. 2007/0053635 published Mar. 8, 2007 in the names of Iazikov et al, which is incorporated by reference as if fully set forth herein.

The transverse sizes of the diffraction gratings 102 can be employed to alter the far-field divergence properties of the output beams 20 (instead of, or in addition to, the arrangements described above involving lenses or arrangements of diffractive elements of the gratings). In some examples, each grating 102 is sufficiently small in one or both of its transverse dimensions that the small grating size at least partly determines a lower limit for the far-field divergence of the corresponding output beam 20. In some examples the far-field divergence imposed on the corresponding output beam 20 by the transverse grating size can exceed (in one or both transverse dimensions) the far-field divergence of the corresponding incident beam 10 or the zero-order-transmitted beam 11.

Enlarged divergence of the output beams 20, regardless of how it is achieved (e.g., using lenses, suitable arranged diffractive elements, reduced grating size, and so forth) typically results in a greater degree of far-field overlap among the output beams 20, which can be advantageously employed for, e.g., arranging the grating array 100 for providing the contiguous composite solid angle of illumination described above. That greater degree of far-field overlap also typically increases the likelihood of overlap of output beams 20 arising from the same incident beam 10 from the same light source 302, and can therefore result in undesirable interference effects, as described above. However, sufficiently large divergences can result in far-field overlap, in a given output direction, among many different output beams 20 arising from multiple different sources 302. If interference effects arising from multiple different light sources 302 are superimposed at a given location, those tend to wash each other out, and in some examples can reduce the net effect of interference to an operationally acceptable level. So, while reducing divergence of the output beams 20 to reduce or eliminate beam overlap for a given source 302 (as described earlier herein) provides one avenue for reducing or eliminating undesirable interference effects, increasing output beam divergence, so that multiple interference effects arising from multiple sources 302 overlap and at least partly wash out, provides a different avenue for reducing or eliminating interference effects.

Each one of the diffraction gratings 102 of an inventive grating array 100 can be arranged to provide non-zero-order diffraction of its incident portion of an incident beam 10, and to correspondingly suppress zero-order transmission. Sufficient relative suppression of zero-order transmission (i.e., of the intensity of the output beam 11 relative to the output beams 20) typically is important because output beams 11 from every grating 102 are superimposed in the far field, whereas the output beams 20 are not. The superimposed output beams 11 can outweigh the output beams 20 if zero-order transmission is not sufficiently suppressed and accounted for in the design of the grating array 100. Any suitable grating arrangement or optimization that achieves sufficient relative suppression of zero-order transmission can be employed, such as by selection of one or more of substrate refractive index, refractive index of one or more corresponding grating materials, corresponding grating index contrast, corresponding thicknesses of one or more grating layers, corresponding grating depth, corresponding grating duty cycle, and so forth. Examples are disclosed in, e.g., U.S. Pat. Pub. No. 2009/0116790 published May 7, 2009 in the names of Mossberg et al, which is incorporated by reference as if fully set forth herein. In some examples optimization or selection of one or more those parameters can be done for individual gratings 102; in some examples optimization or selection can be done collectively for subsets of gratings 102 or for all of the gratings 102, which can result in different parameters than would be obtained by individual optimization or selection. In some examples, the gratings 102 can be arranged to maximize positive- and negative-first-order transmissive diffraction while sufficiently suppressing zero-order transmission and providing only negligible second- or higher-order transmissive diffraction; in such examples each grating 102 produces two output beams 20 and one output beam 11 (e.g., as in FIG. 2A). In other examples, the gratings 102 can be arranged to provide first- and higher-order transmissive diffraction while sufficiently suppressing zero-order transmission; in such examples each grating 102 produces three or more output beams 20 and one output beam 11 (e.g., as in FIG. 2B).

If sufficient suppression of zero-order transmission cannot be attained as described above, additional measures can be implemented. In some examples, an incidence-angle-dependent absorptive reflective coating, on the grating substrate or on a discrete, separate substrate, can be arranged so as to suppress zero-order transmission relative to non-zero-order transmissive diffraction. In other examples, an extra lens can be arranged so as to angularly broaden corresponding zero-order-transmitted output beams 11 arising from all of the incident beams 10. Each diffraction grating 102 can be arranged so as to compensate for the extra lens in the corresponding non-zero-order transmissive diffraction of the output beams 20 (i.e., effectively "undoing" in the output beam 20 the effect of the extra lens) so that the output beams 20 are not broadened in a manner similar to the output beams 11. The selective angular spreading of the output beams 11 spreads their contribution to the far-field illumination profile, decreasing their relative contribution near the center of the profile. Instead of acting individually on relative intensities of output beams 11 and 20, the diffraction gratings 102 can be arranged collectively to suppress the contribution of output beams 11 to the far-field illumination profile, by suitable selection and arrangement of gratings 102 to provide output beams 20 of suitable intensity and propagation direction. In the end, sufficiency of the suppression of zero-order transmission of the grating array 100, relative to non-zero-order diffractive transmission, can be evaluated by judging the suitability of the resulting far-field illumination profile for whatever application it is intended.

Further suppression of zero-order-transmitted beams 11 can be achieved by employing a second grating array 100 in series with the first grating array 100. The resulting transmission coefficient for the zero-order-transmitted beams 11 would be the square of the individual transmission coefficients, and therefore could be made quite small (e.g., 5% zero-order transmission per grating array 100 yields 0.25% zero-order transmission if two grating arrays are used). In addition, the output beams 20 from the first grating array 100, spread across many different propagation directions, act as incident beams 10 for the second gratings array 100, leading to an increased multiplicity of output propagation directions among the output beams from the second grating array. More numerous output propagation directions provide more design flexibility for enlarging the contiguous composite solid angle of far-field illumination or for designing a desired output illumination profile. The two grating arrays can have the same arrangement of individual gratings 102 (e.g., with respect to arrangement of size shape, and wavevector of each grating 102), or can have arrangements of individual gratings 102 that differ in any suitable or desirable way. Any suitable arrangement can be employed for using two grating arrays 100, including but not limited to: two gratings arrays 100 formed on separate substrates 101 and then assembled or adhered together (e.g., with adhesive filling recessed features of one or both grating arrays as an encapsulant; by optical contacting; or by other suitable method or arrangement); two grating arrays 100 formed on opposite sides of a single substrate 101; or a first grating array 100 formed on a substrate 101 and a second grating array 100 formed on the first grating array 100 (typically after some sort of planarization or other processing to enable formation of the second grating array 100).

In various examples of an inventive grating array 100, each one of the multiple diffraction gratings 102 has a largest transverse dimension that is less than about 5.0 mm, less than about 2.0 mm, less than about 1.0 mm, less than about 0.50 mm, less than about 0.20 mm, less than about 0.10 mm, less than about 50 µm, less than about 20 µm, less than about 10 µm, or less than about 5 µm. A commonly employed arrangement includes gratings 102 that have transverse dimensions between about 5 µm and about 40 µm. When employed with a VCSEL array having a device pitch between about 30 µm and about 100 µm, the resulting illumination source includes illuminated subsets of gratings 102 that include from about 10 up to a few hundred gratings 102 illuminated by each VCSEL. In some examples the multiple diffraction gratings 102 are all of substantially the same transverse area and shape; in other examples the multiple diffraction gratings 102 are of multiple different transverse areas or shapes. In some examples the multiple diffraction gratings 102 are arranged on the grating substrate 101 as a substantially regular two-dimensional array.

As noted above, the gratings 102 of the grating array 100 include disjoint wavevector subsets of gratings 102, where each wavevector subset includes those diffraction gratings characterized by substantially equal corresponding grating wavevectors. Each wavevector subset is characterized by a grating wavevector that differs from those of the other wavevector subsets, with respect to wavevector magnitude (i.e., grating line spacing), wavevector direction (i.e., grating line orientation), or both. In some examples, the gratings 102 of each wavevector subset are arranged across the grating substrate 101 irregularly or substantially randomly, e.g., as in FIG. 4. In other examples, gratings 102 of a given wavevector subset are arranged across the grating substrate 101 in a repeating pattern.

Figure 4:
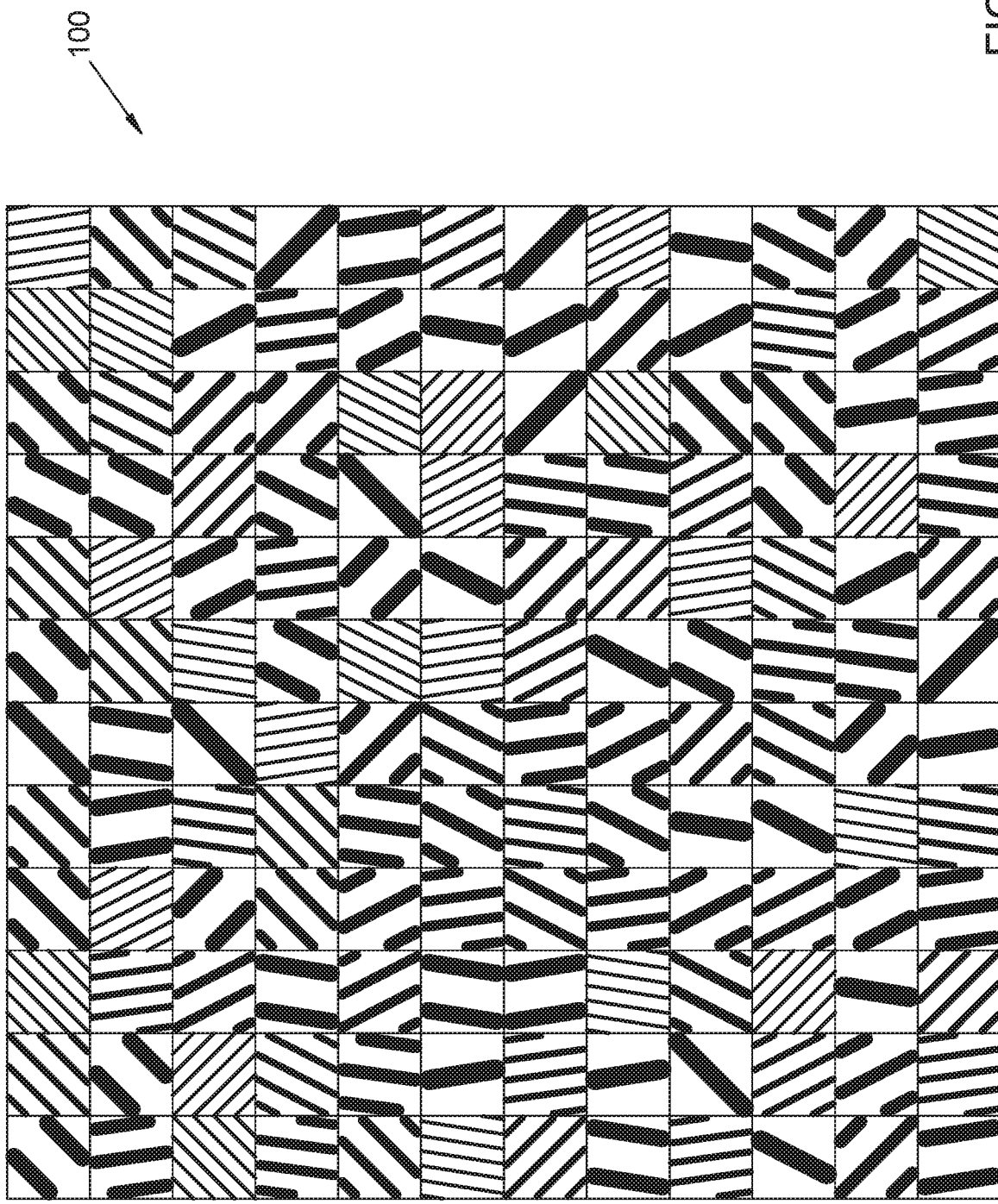
FIGS. 4 and 5A-5D illustrate schematically several examples arrangements of multiple diffraction gratings of a grating array.
Figure 5A:
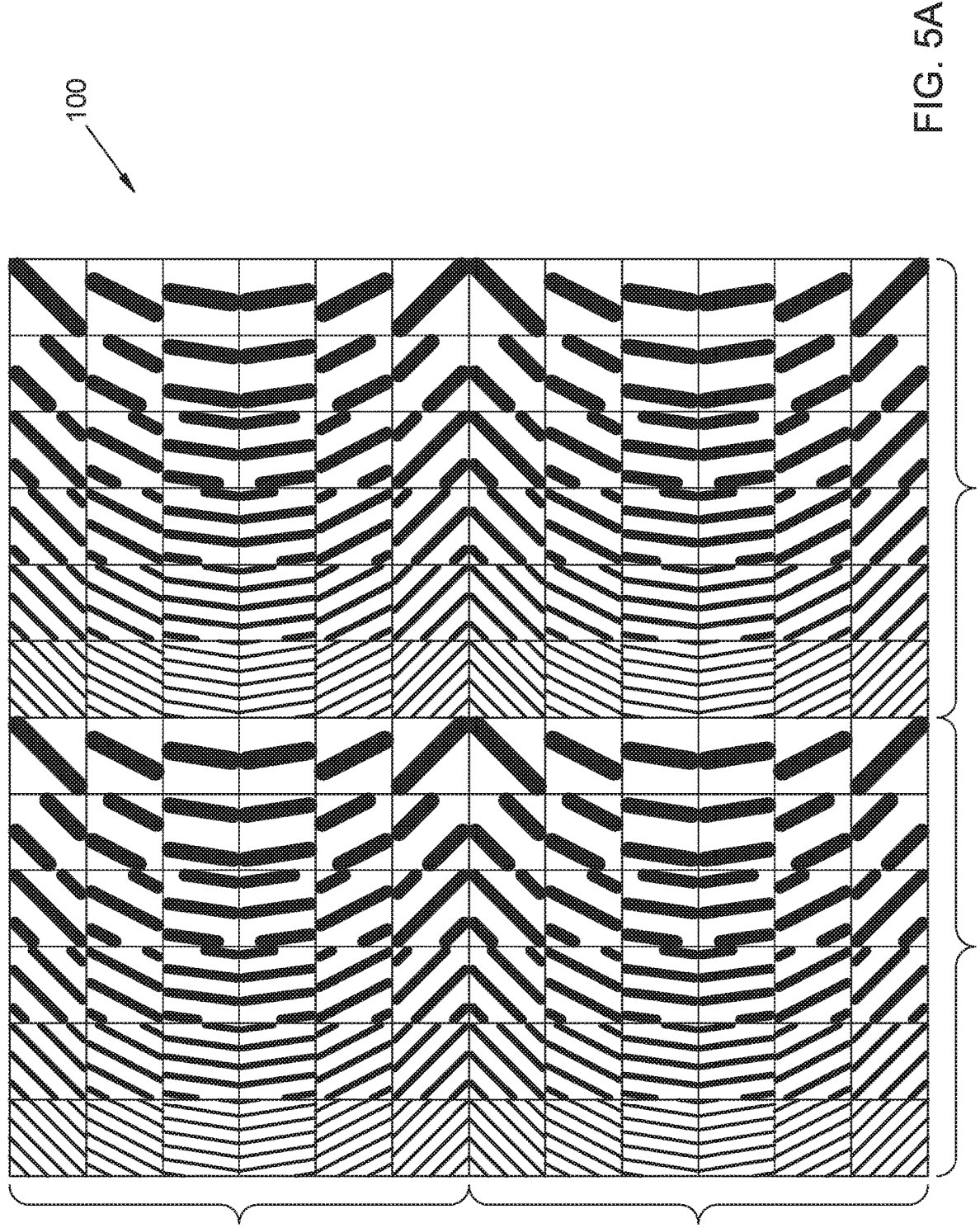
Figure 5B:
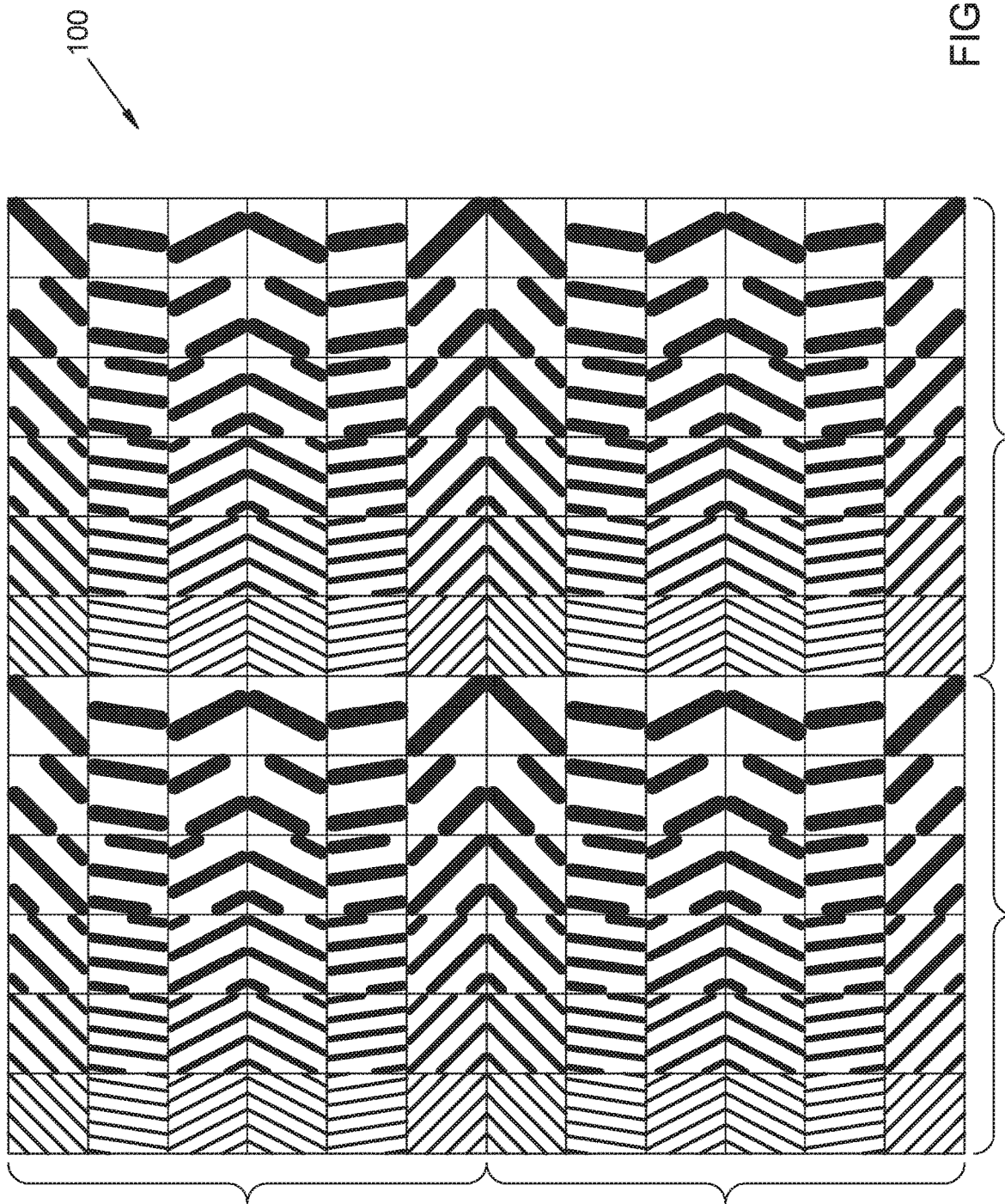
Figure 5C:
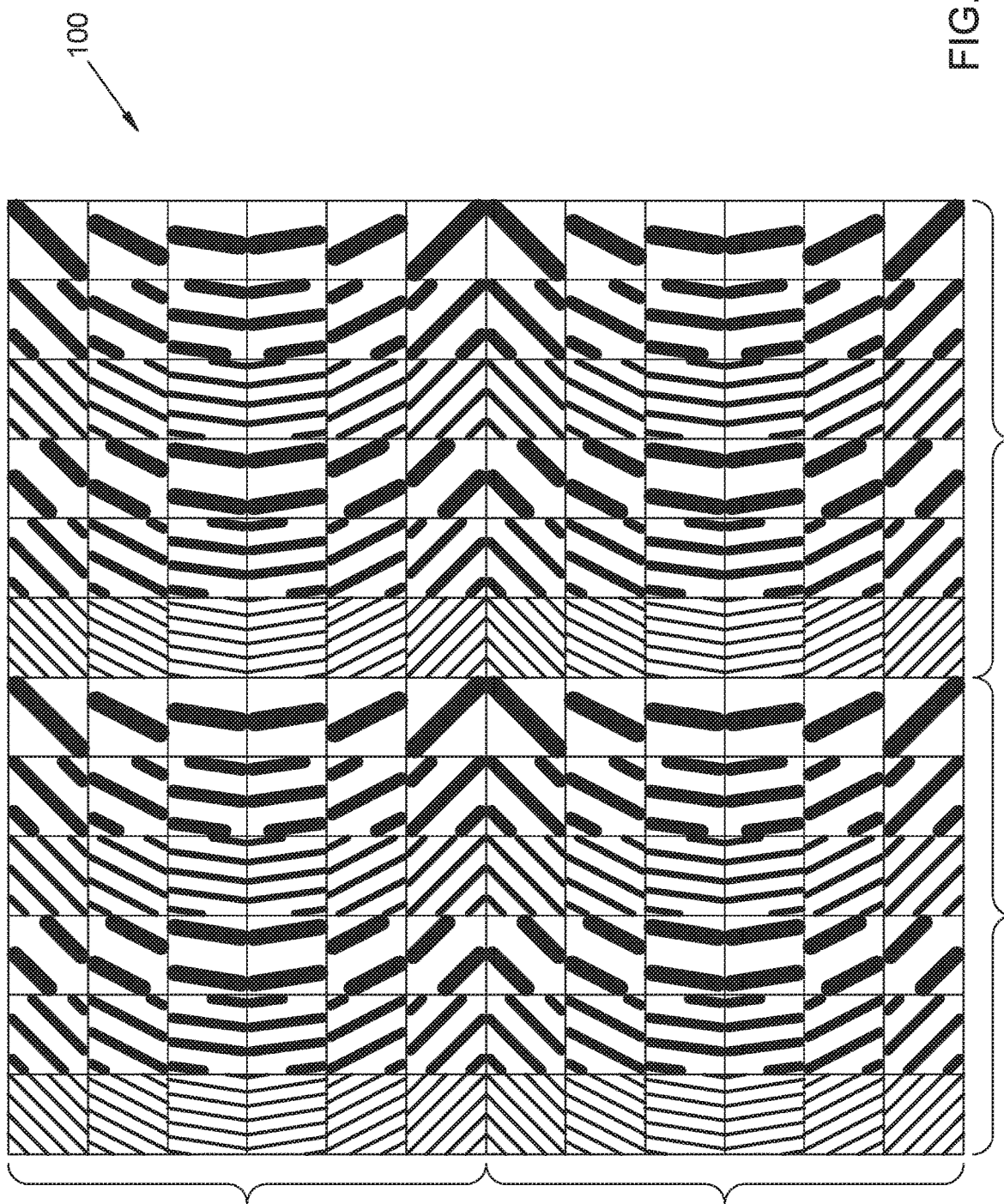
Figure 5D:
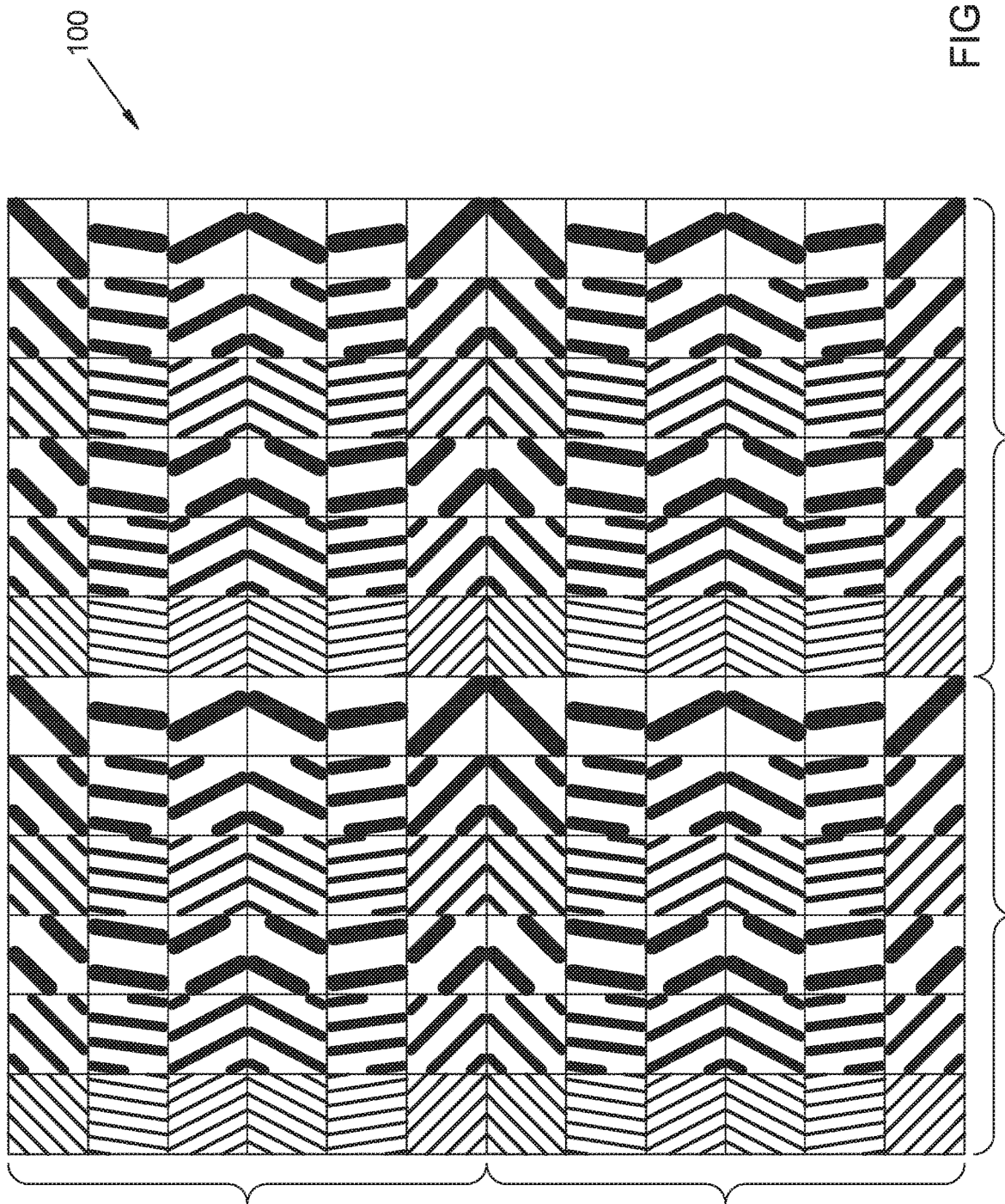

Some specific repeating patterns are shown in FIGS. 5A-5D, in which the gratings 102 are arranged so as to exhibit a repeating pattern of varying wavevector magnitude in one transverse dimension along the grating substrate 101 and a repeating pattern of varying wavevector direction along the other transverse dimension along the grating substrate 101. In FIGS. 4 and 5A-5D, different wavevector magnitudes are represented schematically by varying number and thickness of lines shown in the drawing (fewer, thicker lines representing larger grating spacing, i.e., smaller wavevector; more, thinner lines representing smaller grating spacing, i.e., larger grating wavevector). The varying wavevector directions are represented by the different orientation of the lines in the drawings. The repeating pattern in these examples includes six different wavevector magnitudes and six different wavevector directions; the resulting 6×6 grating "unit cell" of the repeating pattern is indicated in FIGS. 5A-5D. In the example of FIG. 5A, each period of the repeating pattern along one dimension includes monotonic variation of the wavevector magnitudes, and each period of the repeating pattern along the other dimension includes monotonic variation of the wavevector direction (so-called unshuffled). In the example of FIG. 5B, each period of the repeating pattern along one dimension includes monotonic variation of the wavevector magnitudes, and each period of the repeating pattern along the other dimension includes non-monotonic or irregular variation of the wavevector direction (so-called 1D shuffling). In the example of FIG. 5C, each period of the repeating pattern along one dimension includes non-monotonic or irregular variation of the wavevector magnitudes, and each period of the repeating pattern along the other dimension includes monotonic variation of the wavevector direction (also so-called 1D shuffling, but in the other dimension). In the example of FIG. 5D, each period of the repeating pattern along one dimension includes non-monotonic or irregular variation of the wavevector magnitudes, and each period of the repeating pattern along the other dimension includes non-monotonic or irregular variation of the wavevector direction (so-called 2D shuffling). In some of the foregoing examples of repeating patterns of wavevector variation, the gratings 102 and source 302 can be arranged so that each corresponding illuminated subset of gratings 102 includes at most one period of the repeating patterns, so that the resulting output beams 20 would have no, or only negligible, far-field spatial overlap.

The gratings 102 of the array 100 can be arranged in any suitable way to achieve a specified far-field illumination profile. In some examples, the corresponding fractional area of the multiple diffraction gratings 102 that is occupied by each wavevector subset is distributed among the different wavevector subsets so as to result in a specified far-field illumination intensity angular profile. Examples were given above of several far-field illumination spatial profiles that might be employed, e.g., flat, batwing ($1/\cos^N(\theta)$, N=10, often N=4 or N=7), modified batwing that includes a relatively flat or peaked central portion, and so forth. In the examples of FIGS. 4 and 5A-5B, the fractional areas are the same for all wavevectors shown, but this need not be the case, and often is not the case. In some examples, the fractional areas are distributed among the wavevector subsets by variation of corresponding numbers of individual diffraction gratings in each wavevector subset. In some examples, the fractional areas are distributed among the wavevector subsets by variation of corresponding transverse areas of individual diffraction gratings in each wavevector subset. In some example variations of both size and number can be employed. Instead of, or in addition to, employing those variations globally across the entire grating array 100, they can be applied separately to illuminated subsets of the gratings 102 illuminated by corresponding incident beams 10.

In some illumination applications, laser speckle is undesirable. If LEDs are employed as the optical sources 302, then laser speckle does not occur. If laser sources are employed, such as VCSELs 302, then laser speckle can occur. Such speckle can be mitigated by adding to the illumination source an optical diffuser, typically in the form of a suitable arranged phase-scrambling optical layer formed in or on, adhered to, or assembled with the grating substrate 101. It may be preferable for the diffuser to be placed in the paths of output beams 11 and 20, rather than in the paths of incident beams 10. The diffuser (i.e., the phase-scrambling optical layer) is structurally arranged so as to impart a transverse-position-dependent phase variation onto the output optical signal beams. To suppress or eliminate laser speckle, the phase variation typically is irregular or substantially random. Examples of suitable diffusers can include a holographic diffuser, a ground or etched glass or silica layer (e.g., etched with hydrofluoric acid without any patterning or masking), or a ground or etched polymer layer. In any of those examples, the phase shift imparted onto a transmitted laser output beam 11 or 20 is irregular or random, so that the beam exhibits no or reduced speckle upon illuminating a surface.

Instead of, or in addition to, the diffuser described above, effects of laser speckle can be reduced or eliminated by employing enlarged far-field divergence of the output optical beams 20, resulting in far-field overlap of multiple output beams 20 from multiple light source 302. As described above, such enlarged far-field divergence of the output beams 20, regardless of how it is achieved (e.g., using lenses, suitable arranged diffractive elements, reduced grating size, and so forth) typically results in a greater degree of far-field overlap among the output beams 20. As with interference effects described above, sufficiently large divergences can result in far-field overlap, in a given output direction, among many different output beams 20 arising from multiple different sources 302. If laser speckle patterns arising from multiple different light sources 302 are superimposed at a given location, those tend to wash each other out, and in some examples can reduce the effect of laser speckle to an operationally acceptable level.

In addition to the preceding, the following example embodiments fall within the scope of the present disclosure or appended claims:

Example 1. An article comprising a grating substrate bearing a contiguously arranged set of multiple diffraction gratings, wherein: (a) the grating substrate is substantially transparent over an operational wavelength range, the set of multiple diffraction gratings is positioned on a surface of the grating substrate or within the grating substrate, each diffraction grating of the set is characterized by a corresponding grating wavevector, and the multiple diffraction gratings are positioned and arranged on or in the grating substrate so that each diffraction grating of the set differs from at least one other diffraction grating of the set with respect to the corresponding grating wavevectors; (b) the multiple diffraction gratings are positioned and arranged on or in the grating substrate so that corresponding diffracted portions of multiple incident optical signal beams, that are each characterized by a corresponding incident wavelength within the operational wavelength range and that are each incident along a corresponding incident propagation direction on a corresponding non-empty illuminated contiguous subset of the multiple diffraction gratings, are each diffracted into one or more corresponding output optical signal beams by non-zero-order diffractive transmission by the corresponding diffraction gratings of the corresponding illuminated contiguous subset of the multiple diffraction gratings, the output optical signal beams each being characterized by the corresponding incident wavelength, a corresponding output propagation direction, and a corresponding output beam far-field divergence; and (c) the multiple diffraction gratings are collectively positioned and arranged on or in the grating substrate so that angular separation of the output propagation direction of each one of the output optical beams, from the output propagation direction of at least one other of the output optical beams, is less than the corresponding far-field divergence of that optical beam, so that collectively the output optical beams and zero-order-transmitted portions of the incident optical beams result in a contiguous composite solid angle of far-field illumination.

Example 2. The article of Example 1 wherein the contiguous composite solid angle of far-field illumination is larger than a non-diffractive solid angle of far-field illumination resulting from only the zero-order-transmitted portions of the incident optical beams.

Example 3. The article of any one of Examples 1 or 2 wherein (i) the set of multiple diffraction gratings comprises multiple non-empty wavevector subsets of diffraction gratings, each wavevector subset including those diffraction gratings that are characterized by a corresponding common grating wavevector that differs from common grating wavevectors of the other wavevector subsets, (ii) within each corresponding wavevector subset, each one of the diffraction gratings of that subset includes diffractive elements that are offset by corresponding offset distances relative to a set of virtual reference grating lines that are characterized by the common corresponding grating wavevector of the subset, the corresponding displacement of each diffraction grating differing from that of at least one other diffraction grating of the wavevector subset, (iii) the offset distances result in corresponding phase shifts among the corresponding output optical signal beams that in turn result in a desired far-field intensity distribution of the far-field illumination.

Example 4. A method for using the article of any one of Examples 1 through 3, the method comprising: (A) illuminating with each one of multiple incident optical signal beams along a corresponding incident propagation direction a corresponding contiguous non-empty subset of the multiple diffraction gratings, wherein each one of the incident optical beams is characterized by a corresponding incident wavelength within the operational wavelength range; and (B) diffracting, by non-zero-order diffractive transmission by a corresponding one of the diffraction gratings each of the illuminated contiguous subsets of the multiple diffraction gratings, each corresponding diffracted portion of the incident optical signal beams into one or more corresponding output optical signal beams, the output optical signal beams each being characterized by the corresponding incident wavelength, a corresponding output propagation direction, and a corresponding output beam far-field divergence, (C) wherein angular separation of the output propagation direction of each one of the output optical beams, from the output propagation direction of at least one other of the output optical beams, is less than the corresponding far-field divergence of that optical beam, so that collectively the output optical beams and zero-order-transmitted portions of the incident optical beams result in a contiguous composite solid angle of far-field illumination.

Example 5. The article of any one of Examples 1 or 2 wherein the multiple diffraction gratings are collectively positioned and arranged on or in the grating substrate so that, for the corresponding contiguous subset of the multiple diffraction gratings illuminated by each incident optical signal beam, angular separation of the output propagation direction of the corresponding output optical beam of each one of the diffracted portions of that incident optical signal beam, from output propagation directions of the corresponding output optical beams of each of the other diffracted portions of that incident optical signal beam, exceeds corresponding far-field divergence of that output optical beam.

Example 6. A method for using the article of Example 5, the method comprising: (A) illuminating with each one of multiple incident optical signal beams along a corresponding incident propagation direction a corresponding contiguous non-empty subset of the multiple diffraction gratings, wherein each one of the incident optical beams is characterized by a corresponding incident wavelength within the operational wavelength range; and (B) diffracting, by non-zero-order diffractive transmission by a corresponding one of the diffraction gratings each of the illuminated contiguous subsets of the multiple diffraction gratings, each corresponding diffracted portion of the incident optical signal beams into one or more corresponding output optical signal beams, the output optical signal beams each being characterized by the corresponding incident wavelength, a corresponding output propagation direction, and a corresponding output beam far-field divergence, wherein: (C) for each corresponding contiguous subset of the multiple diffraction gratings illuminated by a corresponding one of the incident optical signal beams, angular separation of the output propagation direction of the corresponding output optical beam of each one of the diffracted portions of that incident optical signal beam, from output propagation directions of the corresponding output optical beams of each of the other diffracted portions of that incident optical signal beam, exceeds corresponding far-field divergence of that output optical beam, resulting in only negligible far-field spatial overlap among the output optical beams of the diffracted portions of that incident optical signal beam; and (D) angular separation of the output propagation direction of each one of the output optical beams, from the output propagation direction of at least one other of the output optical beams, is less than the corresponding far-field divergence of that optical beam, so that collectively the output optical beams and zero-order-transmitted portions of the incident optical beams result in a contiguous composite solid angle of far-field illumination.

Example 7. An article comprising a grating substrate bearing a contiguously arranged set of multiple diffraction gratings, wherein: (a) the grating substrate is substantially transparent over an operational wavelength range, the set of multiple diffraction gratings is positioned on a surface of the grating substrate or within the grating substrate, each diffraction grating of the set is characterized by a corresponding grating wavevector, and the multiple diffraction gratings are positioned and arranged on or in the grating substrate so that each diffraction grating of the set differs from at least one other diffraction grating of the set with respect to the corresponding grating wavevectors; (b) the multiple diffraction gratings are positioned and arranged on or in the grating substrate so that corresponding diffracted portions of an incident optical signal beam, that is characterized by a corresponding incident wavelength within the operational wavelength range and that is incident along a corresponding incident propagation direction on a corresponding non-empty illuminated contiguous subset of the multiple diffraction gratings, are each diffracted into one or more corresponding output optical signal beams by non-zero-order diffractive transmission by the corresponding diffraction gratings of the corresponding illuminated contiguous subset of the multiple diffraction gratings, the output optical signal beams each being characterized by the corresponding incident wavelength, a corresponding output propagation direction, and a corresponding output beam far-field divergence; and (c) the multiple diffraction gratings are collectively positioned and arranged on or in the grating substrate so that, for the corresponding contiguous subset of the multiple diffraction gratings illuminated by the incident optical signal beam, angular separation of the output propagation direction of the corresponding output optical beam of each one of the diffracted portions of the incident optical signal beam, from output propagation directions of the corresponding output optical beams of each of the other diffracted portions of the incident optical signal beam, exceeds corresponding far-field divergence of that output optical beam.

Example 8. A method for using the article of Example 7, the method comprising: (A) illuminating with only a single incident optical signal beam along a corresponding incident propagation direction a non-empty contiguous subset of the multiple diffraction gratings, wherein the incident optical beam is characterized by a corresponding incident wavelength within the operational wavelength range; and (B) diffracting, by non-zero-order diffractive transmission by a corresponding one of the diffraction gratings of the illuminated contiguous subset of the multiple diffraction gratings, each corresponding diffracted portion of the incident optical signal beam into one or more corresponding output optical signal beams, the output optical signal beams each being characterized by the corresponding incident wavelength, a corresponding output propagation direction, and a corresponding output beam far-field divergence, (C) wherein, for the corresponding contiguous subset of the multiple diffraction gratings illuminated by the incident optical signal beam, angular separation of the output propagation direction of the corresponding output optical beam of each one of the diffracted portions of the incident optical signal beam, from output propagation directions of the corresponding output optical beams of each of the other diffracted portions of the incident optical signal beam, exceeds corresponding far-field divergence of that output optical beam, resulting in only negligible far-field spatial overlap among the output optical beams of the diffracted portions of the incident optical signal beam.

Example 9. The article of Example 7 wherein: (b') the multiple diffraction gratings are positioned and arranged on or in the grating substrate so that corresponding diffracted portions of multiple incident optical signal beams, that are each characterized by a corresponding incident wavelength within the operational wavelength range and that are each incident along a corresponding incident propagation direction on a corresponding non-empty illuminated contiguous subset of the multiple diffraction gratings, are each diffracted into one or more corresponding output optical signal beams by non-zero-order diffractive transmission by the corresponding diffraction gratings of the corresponding illuminated contiguous subset of the multiple diffraction gratings, the output optical signal beams each being characterized by the corresponding incident wavelength, a corresponding output propagation direction, and a corresponding output beam far-field divergence; and (c') the multiple diffraction gratings are collectively positioned and arranged on or in the grating substrate so that, for the corresponding contiguous subset of the multiple diffraction gratings illuminated by each incident optical signal beam, angular separation of the output propagation direction of the corresponding output optical beam of each one of the diffracted portions of that incident optical signal beam, from output propagation directions of the corresponding output optical beams of each of the other diffracted portions of that incident optical signal beam, exceeds corresponding far-field divergence of that output optical beam.

Example 10. A method for using the article of Example 10, the method comprising: (A) illuminating with each one of multiple incident optical signal beams along a corresponding incident propagation direction a corresponding contiguous non-empty subset of the multiple diffraction gratings, wherein each one of the incident optical beams is characterized by a corresponding incident wavelength within the operational wavelength range; and (B) diffracting, by non-zero-order diffractive transmission by a corresponding one of the diffraction gratings each of the illuminated contiguous subsets of the multiple diffraction gratings, each corresponding diffracted portion of the incident optical signal beams into one or more corresponding output optical signal beams, the output optical signal beams each being characterized by the corresponding incident wavelength, a corresponding output propagation direction, and a corresponding output beam far-field divergence, (C) wherein, for each corresponding contiguous subset of the multiple diffraction gratings illuminated by a corresponding one of the incident optical signal beams, angular separation of the output propagation direction of the corresponding output optical beam of each one of the diffracted portions of that incident optical signal beam, from output propagation directions of the corresponding output optical beams of each of the other diffracted portions of that incident optical signal beam, exceeds corresponding far-field divergence of that output optical beam, resulting in only negligible far-field spatial overlap among the output optical beams of the diffracted portions of that incident optical signal beam.

Example 11. The article of any one of Examples 1-3, 5, or 9 further comprising, for each one of the multiple incident optical signal beams, a corresponding optical source arranged so as to direct the corresponding incident optical signal beam onto the grating substrate and to illuminate the corresponding illuminated subset of the multiple diffraction gratings.

Example 12. The article of Example 11 wherein the multiple diffraction gratings and the corresponding optical sources are positioned and arranged so that each one of the multiple diffraction gratings is illuminated by at most one of the multiple incident signal beams.

Example 13. The article of Example 11 wherein the multiple diffraction gratings and the corresponding optical sources are positioned and arranged so that one or more of the multiple diffraction gratings is illuminated by two or more of the multiple incident signal beams.

Example 14. The article of any one of Examples 11 through 13 wherein the multiple diffraction gratings and the corresponding optical sources are positioned and arranged so that each illuminated subset includes ten or more of the multiple diffraction gratings.

Example 15. The article of any one of Examples 11 through 13 wherein the multiple diffraction gratings and the corresponding optical sources are positioned and arranged so that each illuminated subset includes twenty or more of the multiple diffraction gratings.

Example 16. The article of any one of Examples 11 through 13 wherein the multiple diffraction gratings and the corresponding optical sources are positioned and arranged so that each illuminated subset includes forty or more of the multiple diffraction gratings.

Example 17. The article of any one of Examples 11 through 16 wherein the multiple diffraction gratings and the corresponding optical sources are positioned and arranged so that angular separation of the output propagation direction of each one of the output optical beams, from the output propagation direction of at least one other of the output optical beams, is less than the corresponding far-field divergence of that optical beam, so that collectively the output optical beams and zero-order-transmitted portions of the incident optical beams result in a contiguous composite solid angle of far-field illumination.

Example 18. The article of Example 17 wherein the contiguous composite solid angle of far-field illumination is larger than a non-diffractive solid angle of far-field illumination resulting from only the zero-order-transmitted portions of the incident optical beams.

Example 19. The article of any one of Examples 11 through 18 wherein the corresponding optical sources are arranged as multiple light-emitting diodes or semiconductor lasers positioned on a common source substrate, and the grating substrate is attached to the source substrate.

Example 20. The article of any one of Examples 11 through 19 wherein the corresponding optical sources are arranged as a two-dimensional array of semiconductor lasers positioned on a common source substrate, and the grating substrate is attached to the source substrate.

Example 21. The article of any one of Examples 19 or 20 wherein each semiconductor laser is a VCSEL formed on the common source substrate.

Example 22. The article of Example 21 wherein each VCSEL is arranged so as to emit the corresponding incident optical signal beam through the back side of the common source substrate.

Example 23. The article of any one of Examples 19 through 22 wherein the grating substrate and the source substrate are attached together by being a single, common substrate on which are integrally formed the semiconductor laser array and the multiple diffraction gratings.

Example 24. The article of any one of Examples 19 through 22 wherein the grating substrate and the source substrate are separate, discrete substrates, and the grating substrate is attached directly or indirectly to the source substrate.

Example 25. The article of any one of Examples 19 through 24 wherein the corresponding optical sources include corresponding lenses, each corresponding lens being substantially aligned with a corresponding one of the semiconductor lasers so as to focus, collimate, or alter the far-field divergence of the corresponding incident optical signal beam emitted by that semiconductor laser.

Example 26. The article of Example 25 wherein the lenses are integrally formed on the common source substrate.

Example 27. The article of Example 25 wherein the lenses are formed on a separate, discrete lens substrate that is attached directly or indirectly to the source substrate or the grating substrate.

Example 28. The article of Example 25 wherein the lenses are integrally formed on the grating substrate.

Example 29. The article of any one of Examples 1-3, 5, 7, 9, or 11 through 28 wherein each one of the multiple diffraction gratings is arranged so as to focus, collimate, or alter the far-field divergence of the one or more corresponding output optical signal beams.

Example 30. The article of any one of Examples 1-3, 5, 7, 9, or 11 through 29 wherein each one of the multiple diffraction gratings is sufficiently small in at least one transverse dimension so that in at least one transverse dimension far-field divergence of the corresponding output optical signal beam exceeds far-field divergence of the corresponding incident optical signal beam.

Example 31. The article of any one of Examples 1-3, 5, 7, 9, or 11 through 29 wherein each one of the multiple diffraction gratings is sufficiently small in both transverse dimensions so that in both transverse dimensions far-field divergence of the corresponding output optical signal beam exceeds far-field divergence of the corresponding incident optical signal beam.

Example 32. The article of any one of Examples 1-3, 5, 7, 9, or 11 through 31 wherein each one of the multiple diffraction gratings is arranged so as to produce corresponding output optical signal beams by non-zero-order transmissive diffraction of the corresponding portion of the corresponding incident optical signal beam, and to suppress zero-order transmission of the corresponding portion of the corresponding incident optical signal beam relative to the non-zero-order transmissive diffraction of the corresponding portion of the corresponding incident optical signal beam.

Example 33. The article of Example 32 wherein each one of the multiple diffraction gratings is arranged so as to produce corresponding output optical signal beams by positive- and negative-first-order transmissive diffraction of the corresponding portion of the corresponding incident optical signal beam with only negligible second- or higher-order transmissive diffraction.

Example 34. The article of Example 32 wherein one or more of the multiple diffraction gratings are arranged so as to produce corresponding output optical signal beams by first- and higher-order transmissive diffraction of the corresponding portion of the corresponding incident optical signal beam.

Example 35. The article of any one of Examples 32 through 34 wherein each one of the multiple diffraction gratings are arranged, by selection of one or more of substrate refractive index, refractive index of one or more corresponding grating materials, corresponding grating index contrast, corresponding thicknesses of one or more grating layers, grating depth, corresponding grating duty cycle, so as to suppress zero-order transmission and enhance non-zero-order transmissive diffraction.

Example 36. The article of any one of Examples 32 through 35 further comprising an incidence-angle-dependent absorptive reflective coating, on the grating substrate or on a discrete, separate substrate, arranged so as to suppress zero-order transmission relative to non-zero-order transmissive diffraction.

Example 37. The article of any one of Examples 1-3, 5, 7, 9, or 11 through 36 wherein the multiple diffraction gratings are arranged collectively so as to suppress a contribution, to a far-field illumination intensity angular profile, of zero-order transmission of the corresponding portions of the corresponding incident optical signal beams, relative to contributions of non-zero-order transmissive diffraction of the corresponding portions of the corresponding incident optical signal beams.

Example 38. The article of any one of Examples 1-3, 5, 7, 9, or 11 through 37 further comprising a lens arranged so as to angularly broaden corresponding zero-order-transmitted portions of the corresponding incident optical signal beam, wherein each diffraction grating is arranged so as to compensate for the lens in corresponding non-zero-order transmissive diffraction of the corresponding portions of the corresponding incident optical signal beam, thereby suppressing a contribution, to a far-field illumination intensity angular profile, of zero-order transmission of the corresponding portions of the corresponding incident optical signal beam, relative to contributions of the non-zero-order transmissive diffraction of the corresponding portions of the corresponding incident optical signal beam.

Example 39. The article of any one of Examples 1-3, 5, 7, 9, or 11 through 38 further comprising a second, similarly arranged grating array positioned so that output optical beams of the second grating array serve as the incident optical signal beams for the grating array.

Example 40. The article of any one of Examples 1-3, 5, 7, 9, or 11 through 39 wherein the grating substrate is substantially flat.

Example 41. The article of any one of Examples 1-3, 5, 7, 9, or 11 through 40 wherein each one of the multiple diffraction gratings has a largest transverse dimension that is less than about 2.0 mm, less than about 1.0 mm, less than about 0.50 mm, less than about 0.20 mm, less than about 0.10 mm, less than about 50 µm, less than about 20 µm, less than about 10 µm, or less than about 5 µm.

Example 42. The article of any one of Examples 1-3, 5, 7, 9, or 11 through 41 wherein the multiple diffraction gratings are of substantially the same transverse area and shape.

Example 43. The article of any one of Examples 1-3, 5, 7, 9, or 11 through 41 wherein the multiple diffraction gratings are of multiple different transverse areas or shapes.

Example 44. The article of any one of Examples 1-3, 5, 7, 9, or 11 through 43 wherein the multiple diffraction gratings are arranged on the grating substrate as a substantially regular two-dimensional array.

Example 45. The article of any one of Examples 1-3, 5, 7, 9, or 11 through 44 wherein those diffraction gratings characterized by substantially equal corresponding grating wavevectors are arranged across the grating substrate irregularly or substantially randomly.

Example 46. The article of any one of Examples 1-3, 5, 7, 9, or 11 through 44 wherein those diffraction gratings characterized by substantially equal corresponding grating wavevectors are arranged across the grating substrate in a repeating pattern.

Example 47. The article of any one of Examples 1-3, 5, 7, 9, or 11 through 44 wherein the multiple diffraction gratings are positioned and arranged so that (i) magnitudes of the corresponding grating wavevectors of the multiple diffraction gratings vary in a first periodically repeating spatial pattern along a first transverse direction along the grating substrate, and (ii) directions of the corresponding grating wavevectors of the multiple diffraction gratings vary in a second periodically repeating spatial pattern along a second transverse direction along the grating substrate, the first and second directions being non-parallel.

Example 48. The article of Example 47 wherein (i) each period of the first repeating pattern comprises a monotonic variation of the magnitudes of the corresponding grating wavevectors and (ii) each period of the second repeating pattern comprises a monotonic variation of the directions of the corresponding grating wavevectors.

Example 49. The article of Example 47 wherein (i) each period of the first repeating pattern comprises a monotonic variation of the magnitudes of the corresponding grating wavevectors and (ii) each period of the second repeating pattern comprises a non-monotonic or irregular variation of the directions of the corresponding grating wavevectors.

Example 50. The article of Example 47 wherein (i) each period of the first repeating pattern comprises a non-monotonic or irregular variation of the magnitudes of the corresponding grating wavevectors and (ii) each period of the second repeating pattern comprises a monotonic variation of the directions of the corresponding grating wavevectors.

Example 51. The article of Example 47 wherein (i) each period of the first repeating pattern comprises a non-monotonic or irregular variation of the magnitudes of the corresponding grating wavevectors and (ii) each period of the second repeating pattern comprises a non-monotonic or irregular variation of the directions of the corresponding grating wavevectors.

Example 52. The article of any one of Examples 46 through 51 wherein each corresponding illuminated subset includes at most one period of the first repeating pattern and at most one period of the second repeating pattern.

Example 53. The article of any one of Examples 1-3, 5, 7, 9, or 11 through 52 wherein (i) the set of multiple diffraction gratings comprises multiple non-empty wavevector subsets of diffraction gratings, each wavevector subset including those diffraction gratings that are characterized by a corresponding common grating wavevector that differs from common grating wavevectors of the other wavevector subsets, and (ii) corresponding fractional area of the multiple diffraction gratings occupied by each wavevector subset is distributed among the different wavevector subsets so as to result in a specified far-field illumination intensity angular profile.

Example 54. The article of Example 53 wherein the corresponding fractional areas occupied by the diffraction gratings of each wavevector subset is distributed among the different wavevector subsets by variation of corresponding numbers of individual diffraction gratings in each wavevector subset.

Example 55. The article of any one of Examples 53 or 54 wherein the corresponding fractional areas occupied by the diffraction gratings of each wavevector subset is distributed among the different wavevector subsets by variation of corresponding transverse areas of individual diffraction gratings in each wavevector subset.

Example 56. The article of any one of Examples 1-3, 5, 7, 9, or 11 through 55 wherein corresponding fractional area of the multiple diffraction gratings of each illuminated subset occupied by each wavevector subset is distributed among the different wavevector subsets so as to result in a specified far-field illumination intensity angular profile for at least a portion of an output angular range that differs from far-field illumination resulting from only the zero-order-transmitted portions of the incident optical beams.

Example 57. The article of any one of Examples 1-3, 5, 7, 9, or 11 through 56 wherein the specified far-field illumination intensity angular profile is approximated by $1/\cos^N(\theta)$ for angles $\theta$ greater than about 10°, where the angle $\theta$ is measured from a propagation direction of the incident optical signal beams and N is an integer.

Example 58. The article of Example 57 wherein N=4 or N=7.

Example 59. The article of any one of Examples 1-3, 5, 7, 9, or 11 through 58 wherein the multiple diffraction gratings are integrally formed in or on the grating substrate.

Example 60. The article of any one of Examples 1-3, 5, 7, 9, or 11 through 58 wherein the multiple diffraction gratings are formed in or on a layer formed on, adhered to, or assembled with the grating substrate.

Example 61. The article of any one of Examples 1-3, 5, 7, 9, or 11 through 60 further comprising a phase-scrambling optical layer formed in or on, adhered to, or assembled with the grating substrate, wherein the phase-scrambling optical layer is structurally arranged so as to impart a transverse-position-dependent phase variation onto the output optical signal beams.

Example 62. The article of Example 61 wherein the phase variation is irregular or substantially random.

Example 63. The article of any one of Examples 61 or 62 wherein the phase variation results in suppression or elimination of laser speckle arising from the output optical signal beams.

Example 64. The article of Examples 61 through 63 wherein the phase-scrambling layer comprises a holographic diffuser layer, a ground or etched glass layer, or a ground or etched polymer layer.

Example 65. The article of Examples 1-3, 5, or 11 through 64 wherein the contiguous composite solid angle of far-field illumination is about equal to a non-diffractive solid angle of far-field illumination resulting from only the zero-order-transmitted portions of the incident optical beams.

Example 66. The article of Examples 1-3, 5, or 11 through 64 wherein the contiguous composite solid angle of far-field illumination is greater than or about equal to 45° by 60°, greater than or about equal to 80° by 100°, or greater than or about equal to 90° by 120°.

Example 67. The article of any one of Examples 1-3, 5, 7, 9, or 11 through 66 wherein each one of the multiple diffraction gratings is a one-dimensional grating characterized by only a single corresponding wavevector direction.

Example 68. The article of any one of Examples 1-3, 5, 7, 9, or 11 through 66 wherein each one of the multiple diffraction gratings is a two-dimensional grating characterized by two corresponding wavevector directions that are not parallel with each other.

Example 69. The article of any one of Examples 1-3, 5, 7, 9, or 11 through 68 wherein the operational wavelength range lies within a range from about 0.20 µm to about 10 µm, within a range from about 0.4 µm to about 2.5 µm, or within a range from about 800 to about 1000 nm.

Example 70. The article of any one of Examples 1-3, 5, 9, or 11 through 69 wherein the corresponding incident wavelengths are all within about 5.0 nm of a nominal incident wavelength within the operational wavelength range, within about 2.0 nm of a nominal incident wavelength within the operational wavelength range, or within about 1.0 nm of a nominal incident wavelength within the operational wavelength range.

Example 71. The article of any one of Examples 1-3, 5, 7, 9, or 11 through 70 wherein the grating substrate or the multiple diffraction gratings include one or more materials among: doped or undoped silicon; one or more doped or undoped III-V semiconductors; doped or undoped silicon oxide, nitride, or oxynitride; one or more doped or undoped metal oxides, nitrides, or oxynitrides; one or more optical glasses; or one or more doped or undoped polymers.

Example 72. A method for using the article of any one of Examples 11 through 71, the method comprising: (A) illuminating with each one of multiple incident optical signal beams a corresponding contiguous non-empty subset of the multiple diffraction gratings, wherein each one of the incident optical beams is characterized by a corresponding incident wavelength within the operational wavelength range; and (B) diffracting, by non-zero-order diffractive transmission by a corresponding one of the diffraction gratings each of the illuminated contiguous subsets of the multiple diffraction gratings, each corresponding diffracted portion of the incident optical signal beams into one or more corresponding output optical signal beams.

Example 73. A method for fabricating the article of any one of Examples 1-3, 5, 7, 9, or 11 through 71, the method comprising forming the multiple diffraction gratings in or on the grating substrate, or forming on, adhering to, or assembling with the grating substrate a layer bearing the multiple diffraction gratings.

Example 74. The method of Example 73 wherein the multiple diffraction gratings are formed by one or more of: spatially selective dry or wet etching, spatially selective deposition, spatially selective diffusion or densification, photolithography, stamping, molding, embossing, or replication from a master.

Example 75. A method for making the article of any one of Examples 11 through 71, the method comprising assembling the corresponding optical sources with the grating substrate.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable set of one or more features—which features are shown, described, or claimed in the present application—including those sets that may not be explicitly disclosed herein. A "suitable" set of features includes only features that are neither incompatible nor mutually exclusive with respect to any other feature of the set. Accordingly, the appended claims are hereby incorporated into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the scope of the appended claims can, but does not necessarily, encompass the whole of the subject matter disclosed in the present application.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open-ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

The invention claimed is:

1. An article for input beams, each input beam characterized by a corresponding wavelength within an operational wavelength range, the article comprising:
a grating substrate arranged with the input beams being incident thereto and being substantially transparent over the operational wavelength range; and
a plurality of diffraction gratings contiguously arranged on the grating substrate, each diffraction grating being characterized by a corresponding grating wavevector, wherein the diffraction gratings are positioned and arranged so that (i) magnitudes of the corresponding grating wavevector of the diffraction grating vary along a first transverse direction along the grating substrate, and (ii) directions of the corresponding grating wavevectors of the diffraction gratings vary along a second transverse direction along the grating substrate, the diffraction gratings arranged with the input beams being incident thereto as incident beams along a corresponding incident propagation direction and being configured to diffract portions of the incident beams as diffracted portions by non-zero-order diffractive transmission, the diffracted portions and zero-order-transmitted portions of the incident beams being configured to collectively produce a far-field illumination,
wherein a first solid angle of far-field illumination is a composite superposition of all of the diffracted portions arising from the diffraction gratings acting on the incident beams, the first solid angle being larger than a second solid angle of the far-field illumination resulting from the zero-order-transmitted portions of the incident beams.

2. The article of claim 1, wherein a spatial variation of the far-field illumination differs from that resulting from the zero-order-transmitted portions of the input beams.

3. The article of claim 1, wherein the first solid angle of the far-field illumination is larger than a non-diffractive solid angle of the far-field illumination resulting from the zero-order-transmitted portions of the input beams alone.

4. The article of claim 1, wherein the diffraction gratings are integrally formed in or on the grating substrate; or wherein the diffraction gratings are formed in or on a layer formed on, adhered to, or assembled with the grating substrate.

5. The article of claim 1, wherein the diffraction gratings comprises multiple non-empty wavevector subsets of the diffraction gratings, each wavevector subset including those diffraction gratings characterized by a corresponding common grating wavevector that differs from the common grating wavevectors of the other wavevector subsets; wherein within each corresponding wavevector subset, each one of the diffraction gratings of that subset includes diffractive elements that are offset by corresponding offset distances relative to a set of reference grating lines characterized by the common corresponding grating wavevector of the subset, a corresponding displacement of each diffraction grating differing from that of at least one other diffraction grating of the wavevector subset; and wherein the offset distances result in corresponding phase shifts among a corresponding output optical signal beams that in turn result in a far-field intensity distribution of the far-field illumination.

6. The article of claim 1, wherein the diffraction gratings are collectively arranged on or in the grating substrate so that, for a corresponding contiguous subset of the diffraction gratings illuminated by each incident beam, an angular separation of an output propagation direction of each one of the diffracted portions of that incident beam, from output propagation directions of each of the other diffracted portions of that incident beam, exceeds a corresponding far-field divergence of that diffracted beam.

7. The article of claim 1, further comprising, for each one of the incident beams, a corresponding optical source being configured to direct the corresponding incident beam onto the grating substrate and being configured to illuminate a corresponding subset of the diffraction gratings.

8. The article of claim 7, wherein the corresponding optical sources are configured to illuminate each one of the diffraction gratings by at most one of the incident beams or by two or more multiple incident beams; or wherein the diffraction gratings and the corresponding optical sources are arranged so that each illuminated subset includes two or more of the diffraction gratings.

9. The article of claim 7, wherein:
the corresponding optical sources comprise multiple light-emitting diodes, multiple semiconductor lasers, or a two-dimensional array of semiconductor lasers positioned on a source substrate, and the grating substrate is attached to the source substrate; or
each optical source is a VCSEL formed on a source substrate, and each VCSEL is configured to emit the corresponding input beam through a backside of the source substrate; or
the corresponding optical sources are positioned on a source substrate, the grating substrate and the source substrate being (i) a single substrate on which are integrally formed the optical sources and the diffraction gratings, or (ii) separate and discrete substrates with the grating substrate attached directly or indirectly to the source substrate.

10. The article of claim 7, wherein the corresponding optical sources include corresponding lenses, each corresponding lens being substantially aligned with a corresponding one of the optical sources and being configured to focus, collimate, or alter a far-field divergence of the corresponding incident beam emitted by that optical source; and wherein:
the lenses are integrally formed on a source substrate; or
the lenses are formed on a separate, discrete lens substrate that is attached directly or indirectly to the source substrate or the grating substrate; or
the lenses are integrally formed on the grating substrate.

11. A method for making the article of claim 7, the method comprising assembling the corresponding optical sources with the grating substrate.

12. The article of claim 1, wherein:
each one of the diffraction gratings is configured to focus, collimate, or alter a far-field divergence of the one or more corresponding diffracted portions; or
each one of the diffraction gratings is sufficiently small in at least one transverse dimension so that, in the at least one transverse dimension, the far-field divergence of a corresponding diffracted beam exceeds an input beam far-field divergence of the corresponding incident beam; or
each one of the diffraction gratings is sufficiently small in both transverse dimensions so that in both transverse dimensions the far-field divergence of the corresponding diffracted beam exceeds an input beam far-field divergence of the corresponding incident beam; or
each one of the diffraction gratings is configured to produce the corresponding diffracted portions by the non-zero-order transmissive diffraction of a corresponding portion of the corresponding incident beam, and to suppress the zero-order transmission of the corresponding portion of the corresponding incident beam relative to the non-zero-order transmissive diffraction; or
each one of the diffraction gratings is configured to produce the corresponding diffracted portions by positive- and negative-first-order transmissive diffraction of the corresponding portion of the corresponding incident beam with only negligible second- or higher-order transmissive diffraction; or
one or more of the diffraction gratings are configured to produce the corresponding diffracted portions by first- and higher-order transmissive diffraction of the corresponding portion of the corresponding incident beam; or
each one of the diffraction gratings is configured to suppress the zero-order transmission and enhance the non-zero-order transmissive diffraction by selection of one or more of: substrate refractive index, refractive index of one or more corresponding grating materials, corresponding grating index contrast, corresponding thicknesses of one or more grating layers, grating depth, and corresponding grating duty cycle.

13. The article of claim 1, further comprising an incidence-angle-dependent absorptive reflective coating disposed on the grating substrate or disposed on a discrete, separate substrate, the incidence-angle-dependent absorptive reflective coating being configured to suppress the zero-order transmission relative to the non-zero-order transmissive diffraction.

14. The article of claim 1, wherein the diffraction gratings are configured to collectively suppress a contribution, to a far-field illumination intensity angular profile, of the zero-order transmission of the corresponding incident beams, relative to contributions of the non-zero-order transmissive diffraction of the corresponding incident beams.

15. The article of claim 1, further comprising a lens configured to angularly broaden the zero-order-transmitted portions of the corresponding incident beam, wherein each diffraction grating is configured to compensate for the lens in the non-zero-order transmissive diffraction of the corresponding incident beam, thereby suppressing a contribution, to a far-field illumination intensity angular profile, of the zero-order transmission of the corresponding incident beam, relative to contributions of the non-zero-order transmissive diffraction of the corresponding incident beam.

16. The article of claim 1, further comprising a second, similarly arranged grating positioned so that output beams of the second grating serve as the incident beams for the substrate grating.

17. The article of claim 1, wherein:
the grating substrate is substantially flat; or
each one of the diffraction gratings has a largest transverse dimension that is less than about 2.0 mm; or
the diffraction gratings are of a substantially same transverse area and shape; or
wherein the diffraction gratings are of multiple different transverse areas or shapes;
wherein the diffraction gratings are arranged on the grating substrate as a substantially regular two-dimensional array; or
those diffraction gratings characterized by substantially equal corresponding grating wavevectors are arranged across the grating substrate irregularly or substantially randomly; or
those diffraction gratings characterized by substantially equal corresponding grating wavevectors are arranged across the grating substrate in a repeating pattern.

18. The article of claim 1, wherein the diffraction gratings are positioned and arranged so that (i) magnitudes of the corresponding grating wavevectors of the diffraction gratings vary in a first periodically repeating spatial pattern along the first transverse direction along the grating substrate, and (ii) directions of the corresponding grating wavevectors of the diffraction gratings vary in a second periodically repeating spatial pattern along the second transverse direction along the grating substrate, the first and second directions being non-parallel.

19. The article of claim 18, wherein:
(i) each period of the first repeating pattern comprises a monotonic variation of the magnitudes of the corresponding grating wavevectors and (ii) each period of the second repeating pattern comprises a monotonic variation of the directions of the corresponding grating wavevectors; or (i) each period of the first repeating pattern comprises a monotonic variation of the magnitudes of the corresponding grating wavevectors and (ii) each period of the second repeating pattern comprises a non-monotonic or irregular variation of the directions of the corresponding grating wavevectors; or (i) each period of the first repeating pattern comprises a non-monotonic or irregular variation of the magnitudes of the corresponding grating wavevectors and (ii) each period of the second repeating pattern comprises a monotonic variation of the directions of the corresponding grating wavevectors; or (i) each period of the first repeating pattern comprises a non-monotonic or irregular variation of the magnitudes of the corresponding grating wavevectors and (ii) each period of the second repeating pattern comprises a non-monotonic or irregular variation of the directions of the corresponding grating wavevectors.

20. The article of claim 18, wherein each corresponding subset includes at most one period of the first repeating pattern and at most one period of the second repeating pattern.

21. The article of claim 1, wherein (i) the plurality of diffraction gratings comprises multiple non-empty wavevector subsets of diffraction gratings, each wavevector subset including those diffraction gratings that are characterized by a corresponding common grating wavevector that differs from common grating wavevectors of the other wavevector subsets, and (ii) corresponding fractional area of the diffraction gratings occupied by each wavevector subset is distributed among the different wavevector subsets so as to result in a specified far-field illumination intensity angular profile.

22. The article of claim 21,
wherein the corresponding fractional areas occupied by the diffraction gratings of each wavevector subset is distributed among the different wavevector subsets by variation of corresponding numbers of individual diffraction gratings in each wavevector subset; or
wherein the corresponding fractional areas occupied by the diffraction gratings of each wavevector subset is distributed among the different wavevector subsets by variation of corresponding transverse areas of individual diffraction gratings in each wavevector subset or wherein the corresponding fractional area of the diffraction gratings of each subset occupied by each wavevector subset is distributed among the different wavevector subsets so as to result in the specified far-field illumination intensity angular profile for at least a portion of an output angular range that differs from far-field illumination resulting from only the zero-order-transmitted portions of the incident beams.

23. The article of claim 21, wherein the specified far-field illumination intensity angular profile is approximated by $1/\cos^N(\theta)$ for angles $\theta$ greater than about 10°, where the angle $\theta$ is measured from a propagation direction of the incident input beams and N is an integer.

24. The article of claim 1, further comprising a phase-scrambling optical layer formed in or on, adhered to, or assembled with the grating substrate, wherein the phase-scrambling optical layer is structurally arranged so as to impart a transverse-position-dependent phase variation onto the diffracted portions; and wherein:
the phase variation is irregular or substantially random; or
the phase variation results in suppression or elimination of laser speckle arising from the diffracted portions; or
the phase-scrambling layer comprises a holographic diffuser layer, a ground or etched glass layer, or a ground or etched polymer layer.

25. The article of claim 1, wherein:
the first solid angle of the far-field illumination is greater than or about equal to 45° in a first dimension by 60° in a second dimension; or
each one of the diffraction gratings is a one-dimensional grating characterized by only a single corresponding wavevector direction; or
each one of the diffraction gratings is a two-dimensional grating characterized by two corresponding wavevector directions that are not parallel with each other;
the operational wavelength range lies within a range from about 0.20 µm to about 10 µm; or
the corresponding incident wavelengths are all within about 5.0 nm of a nominal incident wavelength within the operational wavelength range; or
the grating substrate or the diffraction gratings include one or more materials among: doped or undoped silicon; one or more doped or undoped III-V semiconductors; doped or undoped silicon oxide, nitride, or oxynitride; one or more doped or undoped metal oxides, nitrides, or oxynitrides; one or more optical glasses; or one or more doped or undoped polymers.

26. A method for using the article of claim 1, the method comprising:
(A) illuminating, with each one of the incident beams, a corresponding contiguous non-empty subset of the diffraction gratings; and
(B) diffracting, by the non-zero-order diffractive transmission by a corresponding one of the diffraction gratings of each of the illuminated contiguous subsets of the diffraction gratings, each corresponding portion of the incident beams into one or more corresponding diffracted portions.

27. A method for fabricating the article of claim 1, the method comprising forming the diffraction gratings in or on the grating substrate; or forming on, adhering to, or assembling with the grating substrate a layer bearing the diffraction gratings, wherein the diffraction gratings are formed by one or more of: spatially selective dry or wet etching, spatially selective deposition, spatially selective diffusion or densification, photolithography, stamping, molding, embossing, or replication from a master.

28. The article of claim 1, wherein a spatial variation of the far-field illumination differs from that resulting from the zero-order-transmitted portions of the incident beams alone.

29. The article of claim 1, wherein an angular separation of an output propagation direction of each one of the diffracted portions, from the output propagation direction of at least one other of the diffracted portions, exceeds a corresponding far-field divergence of that diffracted beam.

30. The article of claim 1, wherein the input beams are emitted from at least at least one of a light-emitting diode and/or at least one of a semiconductor laser positioned on a common source substrate, and the grating substrate is attached to the common source substrate.

31. The article of claim 1, wherein the input beams are emitted from one or more semiconductor lasers formed on a common source substrate and the grating substrate is attached to the common source substrate.

32. The article of claim 31 wherein each the one or more semiconductor laser is arranged so as to emit the corresponding input beams through a back side of the common source substrate.

33. The article of claim 32, wherein the grating substrate and the common source substrate are attached together by being a single, common substrate on which are integrally formed the one or more semiconductor lasers and the plurality of diffraction gratings.

34. The article of claim 32, wherein the grating substrate and the common source substrate are separate, discrete substrates, and the grating substrate is attached directly or indirectly to the common source substrate.

35. The article of claim 1, wherein the corresponding input beams include corresponding lenses, each corresponding lens being substantially aligned with a corresponding one of a light-emitting diode and/or a semiconductor laser so as to focus, collimate, or alter a far-field divergence of the corresponding input beams.

36. The article of claim 35 wherein the lenses are integrally formed on a common source substrate.

* * * * *